US012344021B2

(12) United States Patent
Yoda et al.

(10) Patent No.: US 12,344,021 B2
(45) Date of Patent: Jul. 1, 2025

(54) RELEASE MEMBER-INTEGRATED IMAGE FORMING SHEET, RELEASE MEMBER-INTEGRATED IMAGE SHEET, IMAGE SHEET, METHOD FOR MANUFACTURING IMAGE SHEET, DECORATIVE PRODUCT, AND METHOD FOR MANUFACTURING DECORATIVE PRODUCT

(71) Applicant: Dai Nippon Printing Co., Ltd., Tokyo (JP)

(72) Inventors: Shinya Yoda, Tokyo (JP); Hiroto Matsui, Tokyo (JP); Yoshimasa Kobayashi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 315 days.

(21) Appl. No.: 17/759,652

(22) PCT Filed: Feb. 4, 2021

(86) PCT No.: PCT/JP2021/004078

§ 371 (c)(1),
(2) Date: Jul. 28, 2022

(87) PCT Pub. No.: WO2021/157649

PCT Pub. Date: Aug. 12, 2021

(65) Prior Publication Data

US 2023/0072875 A1 Mar. 9, 2023

(30) Foreign Application Priority Data

Feb. 5, 2020 (JP) ................................. 2020-018389

(51) Int. Cl.

*B41M 5/40* (2006.01)
*B44C 1/17* (2006.01)

(52) U.S. Cl.

CPC ........... *B41M 5/40* (2013.01); *B41M 2205/10* (2013.01); *B41M 2205/32* (2013.01); *B41M 2205/36* (2013.01); *B44C 1/172* (2013.01)

(58) Field of Classification Search

CPC . B41M 5/40; B41M 5/41; B41M 5/42; B41M 2205/10; B41M 2205/32; B41M 2205/36; B44C 1/172

See application file for complete search history.

(56) References Cited

U.S. PATENT DOCUMENTS 6,284,708 B1 9/2001 Oshima et al.
7,438,959 B2 10/2008 Kometani et al.

(Continued)

FOREIGN PATENT DOCUMENTS

JP H07-149070 A 6/1995
JP H09-048031 A 2/1997

(Continued)

OTHER PUBLICATIONS

Japanese Office Action (with English translation) dated Mar. 7, 2023 (Application No. 2022-082459).

(Continued)

*Primary Examiner* — Gerard Higgins
(74) *Attorney, Agent, or Firm* — BURR PATENT LAW, PLLC

(57) ABSTRACT

A release member-integrated image forming sheet that can form a high quality image and has good manufacturing suitability, a release member-integrated image sheet, an image sheet, a method for manufacturing an image sheet, a decorative product having a high quality image, and a method for manufacturing a decorative product that can form a high quality image and has good manufacturing suitability. An image forming sheet is integrated with a release member, the image forming sheet can be separated (Continued)

from the release member, the image forming sheet includes an image layer before image formation, a stable peeling force when the image forming sheet is separated from the release member under conditions of a temperature of 25° C. and an angle of 30° is 1,000 mN/cm or less, and the dynamic coefficient of friction between the front and back surfaces of the release member is 0.3 or more and 0.9 or less.

15 Claims, 6 Drawing Sheets

(56) References Cited

U.S. PATENT DOCUMENTS

| | | | | |
|---|---|---|---|---|
| 11,040,526 | B2 * | 6/2021 | Yoshino | C09J 7/40 |
| 2020/0039209 | A1 | 2/2020 | Yoshino et al. | |

FOREIGN PATENT DOCUMENTS

| | | | |
|---|---|---|---|
| JP | H10-329436 | A | 12/1998 |
| JP | 2000-238439 | A | 9/2000 |
| JP | 2000-246848 | A | 9/2000 |
| JP | 2003-175699 | A | 6/2003 |
| JP | 2006-056139 | A | 3/2006 |
| JP | 2013-043935 | A | 3/2013 |
| JP | 2019-166689 | A | 10/2019 |
| WO | 2018/151257 | A1 | 8/2018 |
| WO | 2018/235436 | A1 | 12/2018 |

OTHER PUBLICATIONS

International Search Report and Written Opinion (Application No. PCT/JP2021/004078) dated Apr. 27, 2021 (with English translation).

* cited by examiner 800
850
810

800
850
840
845
810

800
830
810

800
850
830
835
810

800
830
850
810

RELEASE MEMBER-INTEGRATED IMAGE FORMING SHEET, RELEASE MEMBER-INTEGRATED IMAGE SHEET, IMAGE SHEET, METHOD FOR MANUFACTURING IMAGE SHEET, DECORATIVE PRODUCT, AND METHOD FOR MANUFACTURING DECORATIVE PRODUCT

TECHNICAL FIELD

The present disclosure relates to a release member-integrated image forming sheet, a release member-integrated image sheet, an image sheet, a method for manufacturing an image sheet, a decorative product, and a method for manufacturing a decorative product.

BACKGROUND ART

As a method for manufacturing a printed article, a method for forming an image on an image forming layer of a recording medium is known. The image can be formed on the image forming layer by various image forming manners. As the image forming manner, a sublimation transfer manner, a melt transfer manner, an inkjet printing manner, a toner printing manner, and the like are known.

In recent years, attempts are being made to use a printed article manufactured using a recording medium as a decorative sheet, and to use the decorative sheet for the decoration of an article which is the decorative object. As the method for decorating an article using a decorative sheet, an in-mold molding, an insert molding, and the like are known. Patent Literature 1 proposes a decorative sheet in which a cured image layer of an inkjet ink composition is provided on a resin sheet and a method for manufacturing a decorative product using the decorative sheet.

CITATION LIST

Patent Literature

Patent Literature 1: Japanese Patent Laid-Open No. 2013-43935

SUMMARY OF INVENTION

Technical Problem

Objects of the present disclosure are to provide a release member-integrated image forming sheet that can form a high quality image and has good manufacturing suitability when a release member-integrated image sheet or an image sheet is produced; to provide a release member-integrated image sheet that has a high quality image and has good manufacturing suitability when an image sheet is formed; to provide an image sheet having a high quality image; to provide a method for manufacturing an image sheet that can manufacture the image sheet having a high quality image with good manufacturing suitability; to provide a decorative product having a high quality image; and to provide a method for manufacturing a decorative product that can manufacture the decorative product having a high quality image with good manufacturing suitability.

Solution to Problem

A release member-integrated image forming sheet of the present disclosure includes an image forming sheet integrated with a release member, the image forming sheet is separable from the release member, the image forming sheet includes an image layer before image formation, a stable peeling force when the image forming sheet is separated from the release member under conditions of a temperature of 25° C. and an angle of 30° is 1,000 mN/cm or less, and the release member has a dynamic coefficient of friction between front and back surfaces of the release member of 0.3 or more and 0.9 or less.

A release member-integrated image sheet of the present disclosure includes an image formed on the image layer of the release member-integrated image forming sheet of the present disclosure.

An image sheet of the present disclosure is obtained by separating the release member from the above release member-integrated image sheet.

A method for manufacturing an image sheet of the present disclosure includes a step of obtaining a release member-integrated image sheet by forming an image on the image layer before image formation of the above release member-integrated image forming sheet, and a step of separating the release member from the release member-integrated image sheet.

A decorative product of the present disclosure includes an image sheet manufactured by the above method for manufacturing an image sheet integrated with a decorative object.

A method for manufacturing a decorative product of the present disclosure includes a step of obtaining a release member-integrated image sheet by forming an image on the image layer before image formation of the above release member-integrated image forming sheet, a step of integrating the release member-integrated image sheet with a decorative object on the image layer side, and a step of separating the release member from the release member-integrated image sheet integrated with the decorative object.

A method for manufacturing a decorative product of the present disclosure includes a step of obtaining a release member-integrated image sheet by forming an image on the image layer before image formation of the above release member-integrated image forming sheet, a step of Separating the release member from the release member-integrated image sheet, and a step of integrating the image sheet separated from the release member with a decorative object on the image layer side.

A method for manufacturing a decorative product of the present disclosure includes a step of obtaining a release member-integrated image sheet by forming an image on the image layer before image formation of the above release member-integrated image forming sheet, a step of separating the release member from the release member-integrated image sheet, and a step of transferring a transfer layer on a decorative object after the separating step.

Advantageous Effects of Invention

The release member-integrated image forming sheet of the present disclosure can form a high quality image and has good manufacturing suitability when manufacturing a release member-integrated image sheet or an image sheet.

The release member-integrated image sheet of the present disclosure has a high quality image and has good manufacturing suitability when manufacturing an image sheet.

The image sheet of the present disclosure has a high quality image. The method for manufacturing an image sheet of the present disclosure can manufacture the above image sheet of the present disclosure.

The decorative product of the present disclosure has a high quality.

The method for manufacturing a decorative product of the present disclosure can manufacture the above decorative product of the present disclosure and has good manufacturing suitability when manufacturing the above decorative product of the present disclosure.

DESCRIPTION OF EMBODIMENTS

Figure 1:
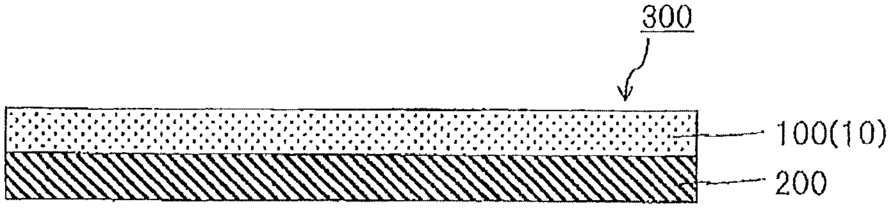
FIG. 1 is a schematic cross-sectional view illustrating one example of the release member-integrated image forming sheet of the present disclosure.

Hereinafter, the embodiments of the present disclosure will be described in detail with reference to the drawings and the like. The present disclosure can be conducted in many different aspects, and should not be construed as being limited to the description of the embodiments exemplified below. To clarify the description, the drawings schematically show the width, thickness, shape, and the like of each part as compared with actual aspects, but they are merely examples and do not limit the interpretation of the present disclosure. In the description of the present application and drawings, elements similar to those described in the previous drawings are denoted with the same reference signs, and the detailed description thereof may be appropriately omitted. For the convenience of the description, the terms “upper” or “lower” are used for explanation, but the vertical direction may be reversed. The same applies to the left and right directions.

<<Release Member-Integrated Image Forming Sheet>>

A release member-integrated image forming sheet 300 of the present disclosure includes an image forming sheet 100 integrated with a release member 200. The image forming sheet 100 can be separated from the release member 200.

The image forming sheet 100 includes an image layer 10 before an image is formed.

FIG. 1 to FIG. 4 are schematic cross-sectional views each showing an example of the release member-integrated image forming sheet 300 of the present disclosure. The release member-integrated image forming sheet of the present disclosure is not limited to the illustrated forms. In addition, the forms illustrated in each drawing may be appropriately combined.

The release member-integrated image forming sheet 300 of the present disclosure can manufacture a release member-integrated image sheet 400 of the present disclosure. The release member-integrated image sheet 400 of the present disclosure includes an image formed on the image layer 10 of the release member-integrated image forming sheet 300 of the present disclosure. The release member-integrated image sheet 400 of the present disclosure can manufacture an image sheet 500 of the present disclosure. The image sheet 500 of the present disclosure is obtained by separating the release member 200 from the release member-integrated image sheet 400 of the present disclosure. On the image layer 10, an image can be formed by various image forming manners owned by a printer.

The suitability for printing at the time of forming an image on the image layer 10 of the image forming sheet with a printer is associated with the suitability for transport of the image forming sheet 100 in the printer. The image forming sheet 100 having good suitability for transport in the printer has good suitability for printing at the time of forming an image on the image layer 10. The image forming sheet 100 having good suitability for printing can form a high quality image in which the occurrence of printing wrinkles and printing unevenness is prevented, on the image layer 10.

The suitability for transport of the image forming sheet in the printer is associated with the thickness of the image forming sheet. As the thickness of the image forming sheet becomes thinner, the suitability for transport of the image forming sheet in the printer becomes lower. On the other hand, the thickness of the image forming sheet may be desired to be thin in some cases, in consideration of the applications of the image sheet to be manufactured from the image forming sheet.

The release member-integrated image forming sheet 300 of the present disclosure can increase the apparent thickness of the image forming sheet 100 by using the release member 200. The release member-integrated image forming sheet 300 of the present disclosure can improve the suitability for transport at the time of forming an image on the image layer 10 with a printer.

The release member-integrated image forming sheet 300 of the present disclosure can improve the suitability for transport of the release member-integrated image forming sheet 300 owing to the presence of the release member 200 when the thickness of the image forming sheet 100 becomes thinner, and can form a high quality image on the image layer 10.

The release member-integrated image sheet 400 of the present disclosure includes an image formed on the image layer 10 of the release member-integrated image forming sheet 300 of the present disclosure. The image sheet 500 of the present disclosure is obtained by separating the release member 200 from the release member-integrated image sheet 400 of the present disclosure. To maintain the quality of the image in the image sheet 500, it is important to prevent the image sheet 500 from damaging when the release member 200 is separated from the release member-integrated image sheet 400 of the present disclosure.

The release member-integrated image forming sheet 300 of the present disclosure satisfies the following condition 1.

(Condition 1) The stable peeling force when the image forming sheet 100 is separated from the release member 200 under conditions of a temperature of 25° C. and an angle of 30° is 1,000 mN/cm or less.

The release member-integrated image forming sheet 300 of the present disclosure enables the release member 200 to be easily separated from the image forming sheet 100, and can prevent the image layer 10 from damaging when the release member 200 is separated.

The release member-integrated image forming sheet 300 of the present disclosure has good workability when the release member 200 is separated from the image forming sheet 100. The release member-integrated image sheet 400 of the present disclosure also enables the release member 200 to be easily separated from the image sheet 500.

The release member-integrated image forming sheet 300 of the present disclosure has good cutting properties. The release member-integrated image forming sheet 300 of the present disclosure can prevent lifting of the release member 200 from occurring when the release member-integrated image forming sheet is cut. The lifting of the release member in the present disclosure means a phenomenon that an unintended peeling of the release member 200 from the image forming sheet 100 occurs at a part of the cut release member-integrated image forming sheet.

The release member-integrated image forming sheet 300 as one example of the present disclosure has a stable peeling force of 100 mN/cm or more and 550 mN/cm or less. The release member-integrated image forming sheet 300 in this form enables the release member 200 to be easily separated from the image forming sheet 100. The release member-integrated image forming sheet 300 in this form can further improve the cutting properties when the release member-integrated image forming sheet 300 is cut.

(Method for Calculating Stable Peeling Force)

The stable peeling force in the present disclosure is a peeling force calculated by the following method.

(A) The release member-integrated image forming sheet as the measurement object is cut into a predetermined width (hereinafter, also referred to as the width A).

(B) The cut release member-integrated image forming sheet as the measurement object is bonded to the stage of a peel analyzer (VPA-3 manufactured by Kyowa Interface Science Co., Ltd.).

Figure 10:
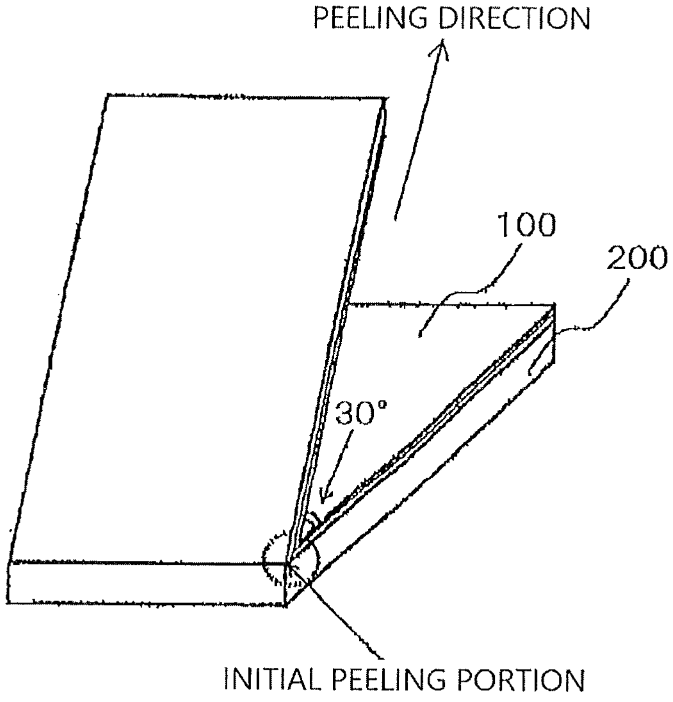
FIG. 10 is a schematic drawing illustrating an example of the method for measuring the stable peeling force and the initial peeling force.

(C-1) The angle in the peel analyzer is set to 30°, and the image forming sheet 100 is peeled from the release member 200 under conditions of a stage temperature: 25° C. (temperature: 25° C.) and a rate: 300 mm/min. The measurement range is the area between a position 5 mm apart and the position 15 mm apart from the initial peeling portion (see FIG. 10) in the peeling direction. The peeling force of the measurement range is measured by a load cell measurement unit attached to the peel analyzer. A value obtained by dividing the peeling force which is the maximum value among measured peeling forces (the maximum peeling force in the measurement range) by the length (width A) in the width direction of the release member-integrated image forming sheet is taken as the stable peeling force.

The release member-integrated image forming sheet 300 as one example of the present disclosure has an initial peeling force when the image forming sheet 100 is separated from the release member 200 under conditions of a temperature of 25° C. and an angle of 30° of 2,500 mN/cm or less, and preferably 100 mN/cm or more and 1,000 mN/cm or less. The release member-integrated image forming sheet 300 in this form has good peeling properties at the initial peeling portion, and has good workability when the image forming sheet 100 is separated from the release member 200. By having good peeling properties at the initial peeling portion, the time from the initiation of the separation until the completion of the separation can be shortened. For example, it is possible to shorten the working time and the like until setting the separated release member in a winding apparatus or the like.

(Method for Calculating Initial Peeling Force)

The initial peeling force in the present disclosure is the peeling force calculated by changing (C-1) in the above method for calculating the stable peeling force to (C-2) below. Except for changing (C-1) to (C-2), this method is common with the above method for calculating the stable peeling force.

(C-2) The angle in the peel analyzer is set to 30°, and the image forming sheet 100 is peeled from the release member 200 under conditions of a stage temperature: 25° C. (temperature: 25° C.) and a rate: 300 mm/min. The measurement range is an area from the initial peeling portion (see FIG. 10) to the position 5 mm apart in the peeling direction (not inclusive of 5 mm). The peeling force of the measurement range is measured by a load cell measurement unit attached to the peel analyzer. A value obtained by dividing the peeling force which is the maximum value among measured peeling forces (the maximum peeling force in the measurement range) by the length (width A) in the width direction of the release member-integrated image forming sheet is taken as the initial peeling force.

The release member-integrated image forming sheet 300 of the present disclosure satisfies the following condition 2.

(Condition 2) The dynamic coefficient of friction between the front and back surfaces of the release member 200 is 0.3 or more and 0.9 or less.

The front surface of the release member 200 in the present disclosure means a surface being in contact with the image forming sheet 100 of the release member 200. The back surface of the release member 200 means the opposite surface thereof. The back surface of the release member 200 constitutes the outermost surface of the release member-integrated image forming sheet 300 of the present disclosure.

The release member-integrated image forming sheet 300 of the present disclosure has good winding properties when the separated release member 200 is wound into a roll form. In the release member-integrated image forming sheet 300 of the present disclosure, the release member 200 separated from the image forming sheet 100 can be wound into a roll form without causing winding deviation. The release member-integrated image forming sheet 300 of the present disclosure has good manufacturing suitability when the image sheet 500 of the present disclosure is manufactured.

The release member-integrated image forming sheet 300 in a form of one example of the present disclosure has a dynamic coefficient of friction between the front and back surfaces of the release member 200 of 0.4 or more and 0.8 or less.

(Method for Calculating Dynamic Coefficient of Friction)

The dynamic coefficient of friction is a value calculated by the following method according to the method described in JIS-K-7125 (1999).

Two release members having a size of 100 mm×100 mm are prepared. Two release members are obtained by cutting the release member which is the measurement object. One release member is immobilized so that its back surface may come into contact with the stage. Then, release members are superposed on each other by placing another release member so that its back surface may come into contact with the front surface of the release member immobilized on the stage. A weight of a load of 50 g is placed thereon, a dynamic friction force when the stage is moved 50 mm at a tensile rate of 10 mm/sec. is measured, and the dynamic coefficient of friction is calculated from the measured value. For the measurement of the dynamic friction force, a surface property measuring apparatus (HEIDON SURFACEPROPERTY TESTER 14DR, Shinto Scientific Co., Ltd.) is used.

Hereinafter, each configuration of the release member-integrated image forming sheet 300 of the present disclosure will be described by way of examples.

The release member-integrated image forming sheet 300 of the present disclosure is only required to satisfy the above (Condition 1) and (Condition 2), and is not limited to the following forms.

<Release Member>

The release member 200 may have a single layer structure or a lamination structure. The release member 200 as one example has a single layer structure consisting of only a resin layer. The release members 200 in the forms illustrated in FIG. 2 to FIG. 4 have a lamination structure in which a support for the release member 210 and a resin layer 250 are laminated in the order presented.

The release member 200 is only required to satisfy the above (Condition 1) and (Condition 2). The adjustment of the stable peeling force may be performed on the image forming sheet 100 side or both sides of the image forming sheet 100 and the release member 200. The dynamic coefficient of friction between the front and back surfaces of the release member 200 may be adjusted by considering the smoothness of the front and back surfaces of the release member 200, the components of the release member, and the like.

(Resin Layer)

The release member 200 as one example includes the resin layer 250 in contact with the image forming sheet 100. In this form, the surface on the image forming sheet 100 side of the resin layer is the front surface of the release member.

The resin layer 250 as one example contains a resin component for adjusting the dynamic coefficient of friction between the front and back surfaces of the release member 200 to 0.3 or more and 0.9 or less.

Examples of the resin component include polyvinyl alcohol, polypropylene, polyethylene, acrylic resins, polystyrene, cellulose resins, polyester, polyurethane, polyamide, epoxy resins, rubber-based resins, ionomers, silicone resins, polybutene, polyisobutene, polybutadiene, and ethylene-vinyl acetate copolymers. The resin component contained in the resin layer 250 may be one or two or more.

The resin layer 250 as one example contains more than 50% by mass of the resin component based on the total mass of the resin layer 250.

The resin layer 250 as one example contains any one or more of polyvinyl alcohol, polypropylene, polyethylene, acrylic resins, polystyrene, and cellulose resins. In the resin layer in this form, the dynamic coefficient of friction and the stable peeling force can be easily adjusted.

The melting point of the resin layer 250 as one example is 110° C. or more.

The resin layer 250 as one example contains a resin component having a melting point of 110° C. or more.

The resin layer 250 as one example contains more than 50% by mass of the resin component having a melting point of 110° C. or more based on the total mass of the resin layer 250.

The resin layer 250 as one example contains a high density polyethylene (HDPE).

The resin layer 250 as one example contains a high density polyethylene (HDPE) having a melting point of 110° C. or more. The high density polyethylene (HDPE) in the present disclosure means a polyethylene having a density of 0.942 g/cm$^3$ or more and 0.97 g/cm$^3$ or less.

The resin layer 250 as one example contains a polypropylene having a melting point of 110° C. or more.

The resin layer 250 in this form can improve the peeling properties at the initial peeling portion. The resin layer in this form can improve the winding properties when the separated release member 200 is wound into a roll form. The resin layer 250 in this form can improve the separation properties when the release member 200 is separated.

The resin layer 250 as one example has a glass transition temperature (Tg) of 0° C. or more.

The resin layer 250 as one example contains a resin component having a glass transition temperature (Tg) of 0° C. or more.

The resin layer 250 as one example contains an acrylic resin having a glass transition temperature (Tg) of 0° C. or more.

The resin layer 250 as one example contains more than 50% by mass of the resin component having a glass transition temperature (Tg) of 0° C. or more based on the total mass of the resin layer 250.

The above glass transition temperature (Tg) of 0° C. or more may be replaced with a glass transition temperature (Tg) of 80° C. or more.

The resin layer in this form can further improve the cutting properties when the release member-integrated image forming sheet 300 is cut. The resin layer in this form can further improve the winding properties when the separated release member 200 is wound into a roll form.

The glass transition temperature (Tg) in the present disclosure is a value obtained by differential scanning calorimetry (DSC) according to JIS-K-7121.

The content of the resin component based on the total mass of the resin layer 250 is not limited, but is preferably 50% by mass or more, and more preferably 70% by mass or more.

The resin layer 250 as one example contains a resin component and wax. Examples of the wax include polyethylene wax, paraffin wax, maleic anhydride, ethoxylated alcohol, fatty acid ester, and silicone wax. In the resin layer in this form, the dynamic coefficient of friction and the stable peeling force can be easily adjusted. The resin layer in this form has good separation properties when the release member 200 is separated.

The content of the wax based on the total mass of the resin layer 250 is not limited, but is preferably 2.5% by mass or more, and more preferably 10% by mass or more.

The resin layer 250 as one example contains a resin component having an elongation at break of 50% or more and 500% or less. The resin layer 250 as one example contains more than 50% by mass of the resin component having an elongation at break of 50% or more and 500% or less based on the total mass of the resin layer 250. The resin layer in this form can further improve the cutting properties of the release member-integrated image forming sheet 300.

The thickness of the resin layer is not limited, but is preferably 0.2 μm or more, and more preferably 0.5 μm or more and 20 μm or less.

(Method for Calculating Elongation at Break)

The elongation at break of the resin component in the present disclosure is a value obtained by measuring the breaking strength according to JIS-K-7113 and calculating by the following (expression 1).

$$\text{Elongation at break } (\%)=100\times(L-L0)/L0 \qquad \text{(Expression 1)}$$

In the expression 1, L0 refers to the length of a test specimen before testing, and L refers to the length of the test specimen at break. The tensile rate of the test specimen is 200 ram/min. The test specimen to be used is fabricated from the resin component which is the measurement object.

The elongation at break of the resin component may be replaced with the elongation at break of the resin layer 250.

The method for forming the resin layer is not limited. The resin layer can be formed by preparing a coating liquid in which a resin component and the like are dispersed or dissolved in an appropriate solvent, and then coating and drying this coating liquid. The method for coating the coating liquid is not limited, and a conventionally known coating method can be appropriately selected. Examples of the coating method include a gravure printing method, a screen printing method, and a reverse coating method using a gravure plate. The resin layer may be formed by a coating method other than these methods.

The resin layer may be a melt extruded resin layer. The melt extruded resin layer in the present disclosure means a resin layer formed by extruding a molten resin using an extruder into a film form. The melt extruded resin layer may be formed by a conventionally known extrusion such as extrusion coating lamination, sandwich lamination, and tandem lamination. Examples of the extruder include a T-die.

The resin layer may be a film base material.

The resin layer may be formed by using resin layers in a film form and pasting them together using an adhesive or the like. The resin layer may be formed by transfer.

(Support for Release Member)

The release member 200 as one example has a lamination structure in which a support for the release member 210 and the resin layer 250 are laminated. The support for the release member 210 and the resin layer 250 may be in contact with each other. The support for the release member 210 as one example has a single layer structure or a lamination structure.

The support for the release member 210 may come into contact with the image forming sheet 100. In this case, the support for the release member 210 is only required to be one that can have a dynamic coefficient of friction between the front and back surfaces of the release member 200 of 0.3 or more and 0.9 or less. In the release member 200 in the form illustrated in FIG. 2, the surface on the image forming sheet 100 side of the resin layer 250 is the front surface of the release member 200, and the surface on the side opposite to the resin layer 250 of the support for the release member 210 is the back surface of the release member 200.

The support for the release member 210 may be a resin base material (or may be a resin film or a resin sheet), or a paper base material.

Examples of the material for the resin base material include polyesters such as polyethylene terephthalate, polyarylate, polycarbonate, polyurethane, polyimide, polyetherimide, cellulose derivatives, polyethylene, ethylene-vinyl acetate copolymers, polypropylene, polystyrene, acryl, polyvinyl chloride, polyvinylidene chloride, polyvinyl alcohol, polyvinyl butyral, nylon, polyether ether ketone, polysulfone, polyether sulfone, tetrafluoroethylene-perfluoroalkyl vinyl ether copolymers, polyvinyl fluoride, tetrafluoroethylene-ethylene copolymers, tetrafluoroethylene-hexafluoropropylene copolymers, polychlorotrifluoroethylene, and polyvinylidene fluoride.

Examples of the paper base material include condenser paper, glassine paper, parchment paper, synthetic paper, wood free paper, art paper, coated paper, non-coated paper, cast-coated paper, wallpaper, cellulose fiber paper, synthetic resin-filled paper, backing paper, and impregnated paper (synthetic resin-impregnated paper, emulsion impregnated paper, synthetic rubber latex-impregnated paper).

The support for the release member 210 as one example contains a plurality of resin base materials.

The support for the release member 210 as one example contains a plurality of paper base materials.

The support for the release member 210 as one example contains one or more resin base materials and one or more paper base materials.

In the release member 200 as one example, the surface on the resin layer 250 side of the support for the release member 210 has been subjected to adhesive treatment. Examples of the adhesive treatment include corona discharge treatment, flame treatment, ozone treatment, ultraviolet treatment, radiation treatment, roughening treatment, chemical treatment, plasma treatment, low temperature plasma treatment, and grafting treatment. The surface opposite to the surface of the resin layer side may be subjected to adhesive treatment. The primer treatment in the present disclosure includes a form in which a primer layer is provided on the surface of the resin layer side of the support for the release member 210. The primer layer constitutes the support for the release member.

The release member 200 as one example includes a void layer (not shown). The release member 200 in this form can form an image of high density on the image layer 10. Examples of the void layer include a film base material (or may be a resin base material) having voids (sometimes referred to as microvoids or holes) on the inside. Examples of the void layer include one manufactured by kneading inorganic particles in a polymer and generating voids using the inorganic particles as nuclei when the mixture is extended, and one obtained by mixing a polymer that is incompatible with the main resin (the polymer may be one or more) and generating voids when the mixture is extended.

The release member 200 as one example has a lamination structure in which the support for the release member 210, the void layer, and the resin layer 250 are laminated in the order presented. The release member as one example has a lamination structure in which the void layer, the support for the release member 210, the void layer, and the resin layer 250 are laminated in the order presented.

The thickness of the release member is not limited, and may be determined by considering the thickness of the image forming sheet 100 and the total thickness of the release member-integrated image forming sheet 300 of the present disclosure. The thickness of the release member-integrated image forming sheet 300 as one example of the present disclosure is 50 μm or more and 1,500 μm or less, preferably 100 μm or more and 300 μm or less, and more preferably 150 μm or more and 250 μm or less. The release member-integrated image forming sheet 300 in this form can further improve the suitability for transport of the printer.

It is preferred to set the thickness of the release member 200 so that the total thickness of the release member-integrated image forming sheet 300 of the present disclosure may be the above thickness by considering the thickness of the image forming sheet 100 and the like. The same applies to the thickness of the resin layer and the support for the thickness of the release member.

<Image Forming Sheet>

The release member-integrated image forming sheet 300 of the present disclosure includes the image forming sheet 100 integrated with the release member 200. The image forming sheet 100 includes the image layer 10 before an image is formed. The image layer 10 before an image is formed in the present disclosure means a layer on which an image can be formed. The image layer before an image is formed may have a predetermined image in advance.

(Image Layer)

On the image layer 10, an image 50 can be formed by various image forming manners. Examples of the representative image forming manner using a printer and the like include a sublimation transfer manner, a melt transfer manner, an inkjet printing manner, and a toner printing manner (laser printing manner). An image layer 10 on which an image can be formed by other image forming methods may be used.

The sublimation transfer manner is an image forming manner in which a heat transfer sheet provided with a color material layer containing sublimation dyes is used, and thermal energy is applied to the heat transfer sheet in accordance with the image information to transfer the sublimation dyes contained in the color material layer into the image layer 10, thereby forming an image.

The melt transfer manner is an image forming manner in which a heat transfer sheet provided with a color material layer containing molten ink is used, and thermal energy is applied to the heat transfer sheet in accordance with the image information to transfer the color material layer which is melted or softened by the application of thermal energy to the image layer 10, thereby forming an image.

The inkjet printing manner is an image forming manner in which ink for inkjet is ejected from a nozzle by a pressure wave generated by piezo drive, or ink is ejected by generating bubbles in a tube by heating, whereby the ink is attached to the image layer 10 to form an image.

The toner printing manner is an image forming manner in which toner is fixed (fused) on the image layer 10 by the heat of a laser or the like by an electrostatic transfer manner.

As the component of the image layer 10, it is only required to appropriately select a component capable of forming an image by the image forming method exemplified above.

The image layer 10 as one example contains a component capable of accepting the sublimation dye. Examples of such a component include acrylic resins, polyolefin, polyvinyl chloride, polyvinylidene chloride, polyvinyl acetate, vinyl chloride-vinyl acetate copolymers, ethylene-vinyl acetate copolymers, polyester, polystyrene, polyamide, copolymers of an olefin such as ethylene or propylene and other vinyl polymers, ionomers, cellulose resins, polycarbonate, epoxy resins, polyvinylpyrrolidone, polyvinyl alcohol, and gelatin. The component contained in the image layer 10 may be one or two or more. Above all, the image layer 10 containing a vinyl chloride-vinyl acetate copolymer can form an image of further high density on the image layer 10 by the sublimation transfer manner.

The thickness of the image layer 10 is not limited, and can be appropriately set in accordance with the image forming method or the like. For example, the thickness of the image layer 10 used in the heat transfer manner is preferably 0.1 μm or more and 10 μm or less. The thickness of the image layer 10 used in the inkjet printing manner is preferably 0.1 μm or more and 50 μm or less, more preferably 1 μm or more and 40 μm or less, and further preferably 3 μm or more and 30 μm or less. The thickness of the image layer 10 used in the toner printing manner is preferably 0.01 μm or more and 5 μm or less, and more preferably 0.05 μm or more and 1 μm or less.

The method for forming the image layer 10 is not limited, and the image layer 10 may be formed by pasting a film to be the image layer 10 and the like or may be formed by coating a coating liquid on the base material and then drying. The image layer 10 may be formed by transfer.

(Base Material)

The image forming sheet 100 as one example includes a base material 1 which holds the image layer 10. The base material 1 is positioned closer to the release member 200 side than the image layer 10. The base material 1 is not limited, and it is only required to appropriately select one described in the above support for the release member or the like.

The base material 1 as one example contains polypropylene.

In the base material 1 as one example, the surface on the release member 200 side has been subjected to release treatment. The release treatment includes a release layer provided on the surface of the release member 200 side of the base material 1.

The base material 1 in this form can further improve the separation properties when the release member 200 is separated.

The base material 1 may have transparency such that the image 50 formed on the image layer 10 is visible from the base material 1 side. The term transparent in the present disclosure includes colorless and transparent, colored transparent, and translucent.

The thickness of the base material is not limited, but is preferably 180 μm or less, more preferably 150 μm or less, and particularly preferably 75 μm or less.

(Primer Layer)

Figure 3:
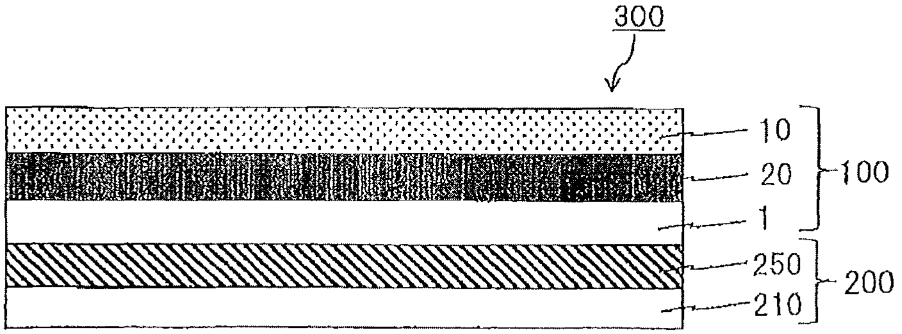
FIG. 3 is a schematic cross-sectional view illustrating one example of the release member-integrated image forming sheet of the present disclosure.

The image forming sheet 100 as one example has a lamination structure in which the base material 1, the primer layer 20, and the image layer 10 are laminated from the release member 200 side in the order presented (see FIG. 3). The release member-integrated image forming sheet 300 in this form has good adhesiveness between the base material 1 and the image layer 10. Instead of this form, a support for the release member subjected to the adhesive treatment described above may be used as the base material, and the image layer 10 may be provided on the adhesive treated surface side.

Examples of the component of the primer layer include acrylic resins, vinyl resins, polyester, polyurethane, polyamide, epoxy resins, rubber-based resins, and ionomers.

(Transfer Layer)

Figure 4:
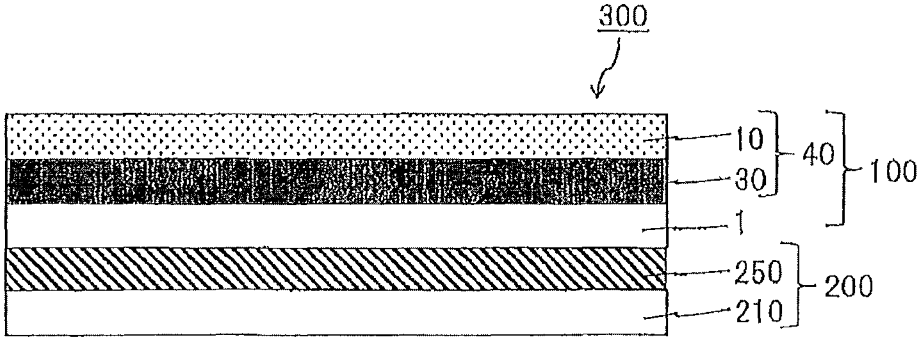
FIG. 4 is a schematic cross-sectional view illustrating one example of the release member-integrated image forming sheet of the present disclosure.

The image forming sheet 100 as one example has a lamination structure in which the base material 1 and a transfer layer 40 are laminated from the release member 200 side in the order presented (see FIG. 4). The transfer layer 40 as one example has a lamination structure in which a peeling layer 30 and the image layer 10 are laminated from the base material 1 side in the order presented. In this form, the transfer layer 40 can be transferred by using the interface between the base material 1 and the peeling layer 30 as the transfer interface. It is also possible to employ a form in which the image layer 10 contains a peeling component, and to have a single layer structure in which the transfer layer 40 consists of only the image layer 10.

The release member-integrated image forming sheet 300 of the present disclosure can increase the transfer sensibility when the transfer layer 40 is transferred by separating the release member 200. The release member-integrated image forming sheet 300 of the present disclosure has good transfer properties when the transfer layer 40 is transferred on an object to be transferred.

(Peeling Layer)

The component of the peeling layer 30 is not limited, and examples thereof include ethylene-vinyl acetate copolymers, vinyl chloride-vinyl acetate copolymers, maleic acid-modified vinyl chloride-vinyl acetate copolymers, polyamide, polyester, polyethylene, ethylene-isobutyl acrylate copolymers, butyral resins, polyvinyl acetate, ionomers, acid-modified polyolefin, (meth)acryl, acrylic acid ester, ethylene-(meth)acrylic acid copolymers, ethylene-(meth) acrylic acid ester copolymers, polymethyl methacrylate, cellulose resins, polyvinyl ether, polyurethane, polycarbonate, polypropylene, epoxy resins, phenol resins, vinyl resin, maleic acid resins, alkyd resins, polyethylene oxides, urea resins, melamine resins, melamine/alkyd resins, silicone resins, rubber-based resins, styrene-butadiene-styrene block copolymers (SBS), styrene-isoprene-styrene block copolymers (SIS), styrene-ethylene-butylene-styrene block copolymers (SEBS), and styrene-ethylene-propylene-styrene block copolymers (SEPS). The thickness of the peeling layer 30 is preferably 1 μm or more and 15 μm or less.

(Release Layer)

The image forming sheet 100 as one example includes a release layer in contact with the release member 200. The release layer is preferred in terms that the above stable peeling force and the above initial peeling force can be easily adjusted. Examples of the component of the release layer include wax, silicone wax, silicone resins, silicone modified resins, fluorine resins, fluorine-modified resins, polyvinyl alcohol, acrylic resins, thermally crosslinking epoxy-amino resins, and thermally crosslinking alkyd-amino resins. The thickness of the release layer is preferably 0.5 μm or more and 5 μm or less.

The image forming sheet 100 may have transparency as a whole.

The release member-integrated image forming sheet 300 of another form of the present disclosure includes the image forming sheet 100 integrated with the release member 200. The release member 200 can be separated from the image forming sheet 100.

In the release member-integrated image forming sheet 300 of another embodiment of the present disclosure, the release member 200 includes a resin layer in contact with the image forming sheet 100.

In the release member-integrated image forming sheet 300 of another embodiment of the present disclosure, the resin layer contains either one of or both a high density polyethylene having a melting point of 110° C. or more and an acrylic resin having a glass transition temperature (Tg) of 0° C. or more.

In the release member-integrated image forming sheet 300 of another embodiment of the present disclosure, the constitution of the release member-integrated image forming sheet 300 of the present disclosure described above may be appropriately selected and used, except for the image forming sheet 100 and the resin layer of the release member 200.

The release member-integrated image forming sheet 300 of another embodiment of the present disclosure exhibits the same function and effect as the release member-integrated image forming sheet 300 of the present disclosure.

The release member-integrated image sheet 400 of another embodiment of the present disclosure includes an image formed on the image layer 10 of the release member-integrated image forming sheet 300 of another embodiment of the present disclosure.

The image sheet 500 of another embodiment of the present disclosure is obtained by separating the release member 200 from the release member-integrated image sheet 400 of another embodiment of the present disclosure.

<<Release Member-Integrated Image Sheet>>

The release member-integrated image sheet 400 of the present disclosure includes an image 50 formed on the image layer 10 of the release member-integrated image forming sheet 300 of the present disclosure.

The release member-integrated image sheet 400 of the present disclosure includes the image sheet 500 of the present disclosure integrated with the release member 200.

Figure 2:
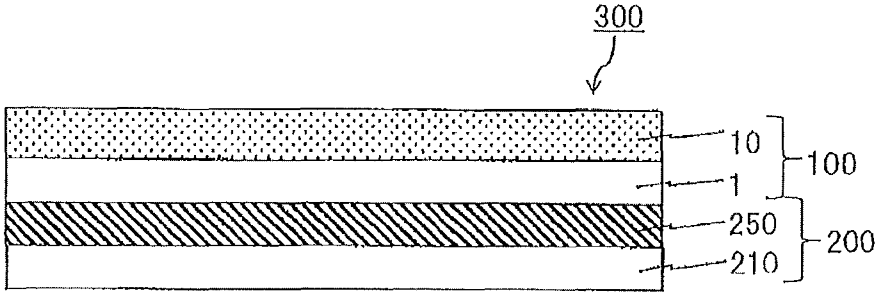
FIG. 2 is a schematic cross-sectional view illustrating one example of the release member-integrated image forming sheet of the present disclosure.
Figure 5:
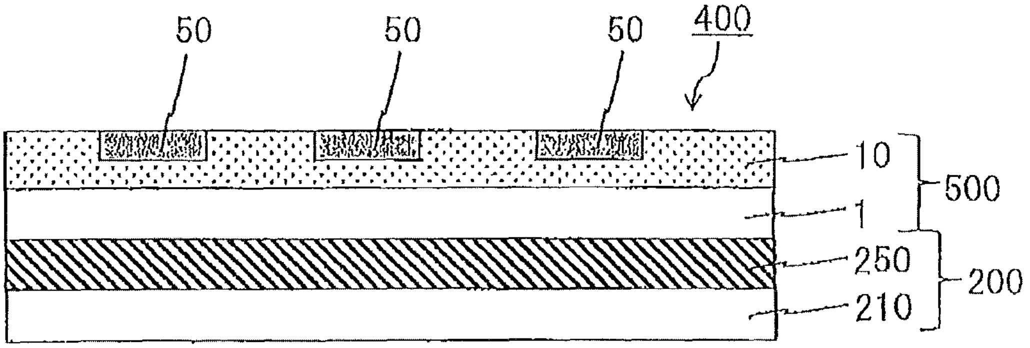
FIG. 5 is a schematic cross-sectional view illustrating one example of the release member-integrated image sheet of the present disclosure.

FIG. 5 is a schematic cross-sectional view illustrating one example of the release member-integrated image sheet 400 of the present disclosure, and includes the image 50 formed on the image layer 10 of the release member-integrated image forming sheet 300 in the form illustrated in FIG. 2. The release member-integrated image sheet 400 of the present disclosure is not limited to the illustrated forms. The forms illustrated in each drawing may be appropriately combined.

In the release member-integrated image sheet 400 of the present disclosure, the image 50 formed on the image layer 10 has a high quality. The release member-integrated image sheet 400 of the present disclosure exhibits the same function and effect as the release member-integrated image forming sheet 300 of the present disclosure.

Figure 6A:
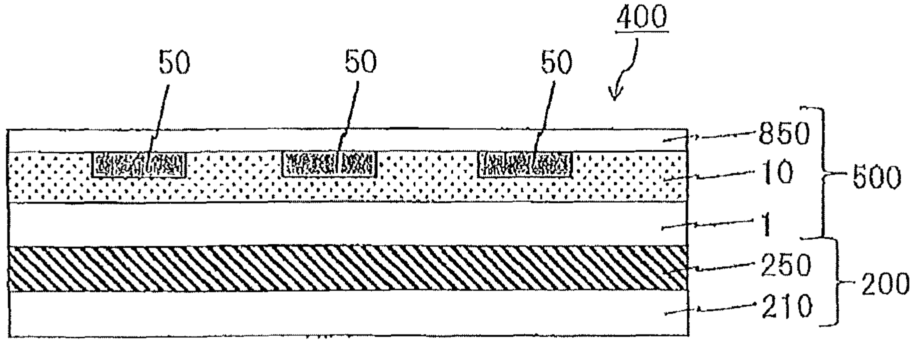
FIG. 6A and FIG. 6B are schematic cross-sectional views illustrating examples of the release member-integrated image sheet of the present disclosure.

In the release member-integrated image sheet 400 as one example of the present disclosure, an adhesion layer 850 is provided on the image layer 10 on which the image 50 is formed (see FIG. 6A). The release member-integrated image sheet 400 in this form can be easily integrated with a decorative object 700 described below.

The adhesion layer contains an adhesion component. Examples of the component having adhesiveness include acrylic resins, vinyl chloride-vinyl acetate copolymers, vinyl acetate, polyester, epoxy resins, polyimide, and synthetic rubber. The component having adhesiveness contained in the adhesion layer 850 may be one or two or more. The adhesion layer 850 may also be an adhesive film or an adhesive sheet. The thickness of the adhesion layer 850 is preferably 1 μm or more and 1,000 μm or less.

The adhesion layer 850 in the description of the present application means a layer whose both surfaces have adhesiveness. The adhesion layer 850 may have a single layer structure consisting of only a layer having adhesiveness, or may have a lamination structure obtained by laminating layers having adhesiveness. The adhesion layer 850 may also have a lamination structure in which layers having adhesiveness are provided on both surfaces of a film or the like. The adhesion layer 850 may be a layer that expresses adhesiveness by contact with water or by heat.

In the release member-integrated image sheet 400 as one example of the present disclosure, the adhesion layer 850 is provided on the image layer 10 and a masking member (not shown) is provided on the adhesion layer 850. The release member-integrated image sheet 400 in this form can prevent the adhesion layer 850 from bonding to the release member 200 when the release member-integrated image sheet 400 is wound up and stored.

Examples of the masking member include those conventionally known in the field of release film, separate paper, separate film, release film, release paper. Also, the masking member may be a resin layer. The masking member as one example contains a component having release properties. Examples of the component having release properties include silicone resins, fluorine resins, aminoalkyd resins, melamine resins, acrylic resins, polyester, and wax.

Figures 7A, 7B, 7C, 7D, 7E:
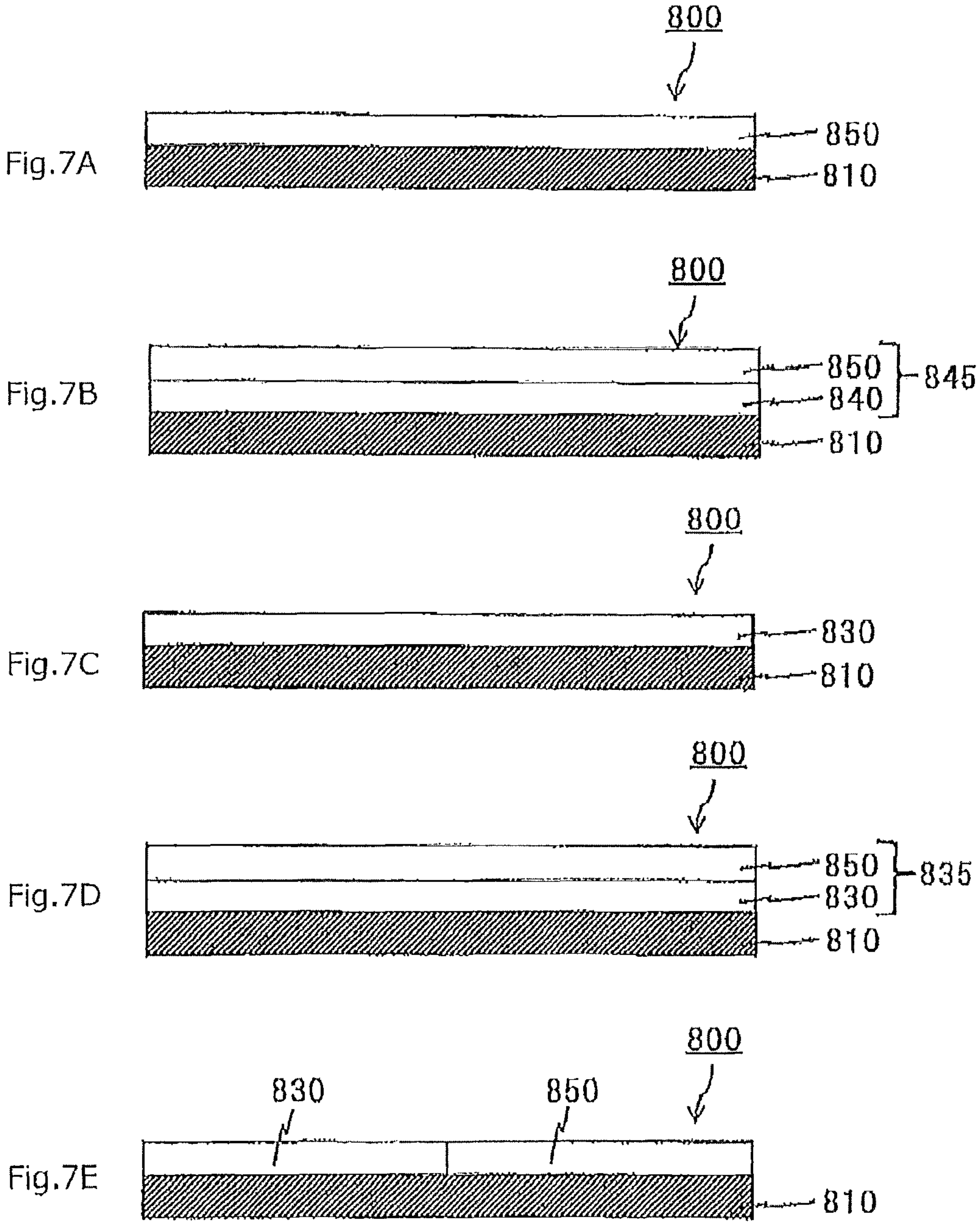
FIG. 7A to FIG. 7E are schematic cross-sectional views illustrating examples of the transfer sheet.

The adhesion layer 850 may be formed by bonding a film to be the adhesion layer 850, a sheet, or the like on the image layer 10 side. As illustrated in FIG. 7A, the adhesion layer 850 may be formed on the image layer 10 by transfer using a transfer sheet 800 in which the adhesion layer 850 is provided on a base material 810 of a transfer sheet so as to be peelable from the base material 810. The adhesion layer 850 of the transfer sheet 800 may be transferred by applying thermal energy, or may be transferred without applying thermal energy. The adhesion layer 850 may be formed on the image layer 10 side by coating and drying a coating liquid in which a component constituting the adhesion layer 850 is dispersed or dissolved in an appropriate solvent. The formation of the adhesion layer 850 using an adhesive film or an adhesive sheet and the formation of the adhesion layer 850 by transfer are preferred as compared with the method of coating and drying a coating liquid, in terms that the bleed of the image 50 formed on the image layer 10 can be prevented.

An adhesion layer with a masking member 845 including a masking member 840 integrated with the adhesion layer 850 may be pasted on the image layer 10. As illustrated in FIG. 7B, the adhesion layer with a masking member 845 may be formed on the image layer 10 by transfer using the transfer sheet 800 provided with the adhesion layer with a masking member 845 which includes the masking member 840 and the adhesion layer 850 is provided on the base material 810 so as to be peelable from the base material 810.

In the transfer sheets having the forms illustrated in FIG. 7A and FIG. 7B, a release layer or the like which remain on the base material 810 side may be provided between the base material 810 and the adhesion layer 850, or between the base material and the adhesion layer with a masking member 845. By providing a release layer, the transfer properties of the adhesion layer 850 and the adhesion layer with a masking member 845 can be improved. In the transfer sheets 800 having the forms illustrated in FIG. 7A and FIG. 7B, one or more color material layers (not shown) may be provided with the adhesion layer 850 and the adhesion layer with a masking member 845 in a frame sequential manner. The transfer sheet 800 in which the color material layer is provided with the adhesion layer 850 and the adhesion layer with a masking member 845 in a frame sequential manner performs the formation of the release member-integrated image forming sheet 300 on the image layer 10 and the transfer of the adhesion layer 850 on the image layer 10 on which the image 50 is formed, by one transfer sheet. The color material layer may be appropriately determined depending on the image forming manner when the image 50 is formed on the image layer 10 of the release member-integrated image forming sheet 300. For example, when the formation of an image on the image layer 10 is carried out by the sublimation transfer manner, the color material layer may be a dye layer containing a yellow dye, a magenta dye, a cyan dye, a fluorescent dye. Further, when the formation of an image on the image layer 10 is carried out by the melt transfer manner, the color material layer may be a molten ink layer containing colorants such as a black pigment, a metallic pigment, a pearl pigment. Further, the color material layer may be the transfer sheet 800 in which a dye layer and a molten ink layer are provided in a frame sequential manner. The same applies to the transfer sheet having a durable layer 830 and an adhesion layer with a durable layer 835 containing the durable layer 830 which are illustrated in FIG. 7C to FIG. 7E. In addition, the forms illustrated in each drawing may be combined.

(Durable Layer)

Figure 6B:
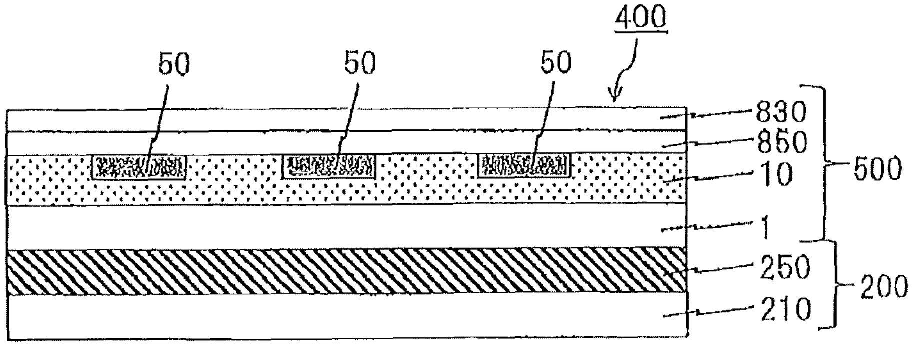

In the release member-integrated image sheet 400 as one example of the present disclosure, the durable layer 830 is provided on the image layer 10 on which the image 50 is formed. In the release member-integrated image sheet 400 as one example of the present disclosure, the durable layer 830 is provided on the image layer 10 on which the image 50 is formed, and the adhesion layer 850 is provided on the durable layer 830 (see FIG. 6B). The release member-integrated image sheet 400 in this form can prevent, in the durable layer 830, the image 50 formed on the image layer 10 from bleeding.

In the release member-integrated image sheet 400 as one example of the present disclosure, the durable layer 830 is provided on the image layer 10, and this durable layer 830 is positioned on the front surface (not shown). When the release member-integrated image sheet 400 having this configuration is integrated on the image layer 10 side with the decorative object 700 on which the adhesion layer 850 is provided, the release member-integrated image sheet 400 can prevent the component of the image 50 formed on the image layer 10 from transferring to the adhesion layer 850 side which is provided on the decorative object 700.

Examples of the component of the durable layer 830 include acrylic resins, polyester, polyurethane, vinyl chloride-vinyl acetate copolymers, cellulose resins, polyvinylpyrrolidone, and polyvinyl alcohol. The component contained in the durable layer 830 may be one or two or more.

In the release member-integrated image sheet 400 as one example of the present disclosure, the durable layer 830 and the adhesion layer 850 are provided on the image layer 10 in the order presented.

The durable layer 830 as one example has a single layer structure or a lamination structure, and includes a first durable layer satisfying the following Expression (2).

The glass transition temperature (Tg) of the main component of the adhesion layer<the glass transition temperature (Tg) of the main component of the first durable layer Expression (2).

The main component as used herein means the component having the highest content among the components contained in the adhesion layer 850. The same applies to the main component of the first durable layer. The first durable layer as one example contains a component having a glass transition temperature (Tg) of 50° C. or more, preferably 60° C. or more as the main component.

The durable layer 830 as one example includes a layer containing an ultraviolet absorber. The durable layer 830 in this form can improve the light fastness of the image of the image layer 10. The durable layer 830 in this form is suitable when the image 50 of the image layer 10 is formed by the sublimation transfer manner.

The durable layer 830 as one example has a lamination structure including a layer containing the ultraviolet absorber and the first durable layer.

The durable layer 830 as one example has a single layer structure or a lamination structure including the first durable layer, and the first durable layer contains an ultraviolet absorber.

Examples of the ultraviolet absorber include benzophenone-based, benzotriazole-based, benzoate-based, triazine-based, and salicylate-based ultraviolet absorbers.

The thickness of the durable layer 830 is preferably 0.01 μm or more and 5 μm or less.

Examples of the method for forming the durable layer 830 include a method for pasting a film to be the durable layer 830 on the image layer 10 using an adhesion layer or an adhesive, a method for forming the durable layer 830 on the image layer 10 by transfer, and a method for forming a durable layer by coating a coating liquid on the image layer 10 and drying. For example, using a transfer sheet in which the durable layer 830 is provided so as to be peelable from the base material 810, the durable layer 830 may be formed on the base material 810 of the transfer sheet on the image layer 10 side by transfer, as illustrated in FIG. 7C and FIG. 7E. Using the transfer sheet 800 in which the adhesion layer with a durable layer 835 including the durable layer 830 and the adhesion layer 850, the adhesion layer with a durable layer 835 may be formed on the base material 810 of the transfer sheet on the image layer 10 side by transfer, as illustrated in FIG. 7D. In the transfer sheets 800 of the forms illustrated in FIG. 7C and FIG. 7D, a release layer or a peeling layer may be provided between the base material 810 and the durable layer 830.

<<Image Sheet>>

The image sheet 500 of the present disclosure is obtained by separating the release member 200 from the release member-integrated image sheet 400 of the present disclosure. The image sheet 500 of the present disclosure is different from the release member-integrated image sheet 400 of the present disclosure in whether the release member 200 is separated, and they are common in other points.

In the image sheet 500 of the present disclosure, the image 50 formed on the image layer 10 has a high quality.

The applications of the image sheet 500 of the present disclosure are not limited, and for example, the image sheet 500 can be used as a decorative sheet for decorating a decorative object to manufacture a decorative product. The image sheet 500 of the present disclosure may be a printed article. Other applications are also possible.

In the image sheet 500 as one example of the present disclosure, the durable layer 830 is provided on the image layer 10. In the image sheet 500 as one example of the present disclosure, the durable layer 830 is provided on the image layer 10, and the adhesion layer 850 is provided on the durable layer 830. The image sheet 500 in this form can prevent the image 50 of the image layer 10 from bleeding on the durable layer 830.

In the image sheet 500 as one example of the present disclosure, the adhesion layer 850 is provided on the image layer 10.

The image sheet 500 as one example has transparency as a whole. The image sheet 500 as one example includes the base material 1 and the image layer 10 on which the image 50 is formed, and the image on the image layer 10 is visible from the base material 1 side.

<<Method for Manufacturing Image Sheet>>

The method for manufacturing an image sheet of the present disclosure includes a step of obtaining a release member-integrated image sheet and a step of separating the release member. The image sheet manufactured by the method for manufacturing an image sheet of the present disclosure can be used as a decorative sheet for manufacturing a decorative product.

<Step of Obtaining Release Member-Integrated Image Sheet>

This step is a step of forming an image on the image layer 10 of the release member-integrated image forming sheet 300, thereby making the release member-integrated image forming sheet into a release member-integrated image sheet. The method for manufacturing an image sheet of the present disclosure uses the release member-integrated image forming sheet 300 of the present disclosure.

The method for forming the image 50 on the image layer 10 is not limited, and various image forming methods owned by a printer described above can be appropriately selected. In the method for manufacturing an image sheet as one example of the present disclosure, the formation of the image 50 on the image layer 10 is carried out using the sublimation transfer manner or the melt transfer manner. The method for manufacturing an image sheet of the present disclosure can form a high quality image on the image layer 10.

The release member-integrated image sheet 400 obtained in this step corresponds to the release member-integrated image sheet 400 of the present disclosure. The method for manufacturing an image sheet of the present disclosure may include an optional step described in the release member-integrated image sheet 400 of the present disclosure. For example, a step of forming the durable layer 830 on the image layer 10 on which an image is formed, or a step of forming the adhesion layer 850 on the durable layer 830 may be included. In addition, an optional step other than these steps may be included. The optional step may be carried out after the step of separating the release member 200 or before the step of separating the release member 200.

<Step of Separating Release Member>

This step is a step of separating the release member 200 from the obtained release member-integrated image sheet 400. Through this step, the image sheet 500 can be manufactured. The image sheet 500 manufactured by the method for manufacturing an image sheet of the present disclosure corresponds to the image sheet 500 of the present disclosure.

The release member 200 can be separated from the release member-integrated image sheet 400 by a peeling roller, a peeling plate, or the like. The method for manufacturing an image sheet of the present disclosure enables the release member 200 to be easily separated from the release member-integrated image sheet 400.

<Winding Step>

The method for manufacturing an image sheet as one example of the present disclosure includes a winding step of winding up the separated release member 200. The method for manufacturing the image sheet in this form has good winding properties when the separated release member is wound into a roll form.

<<Method for Manufacturing Decorative Product>>

Figure 8A:
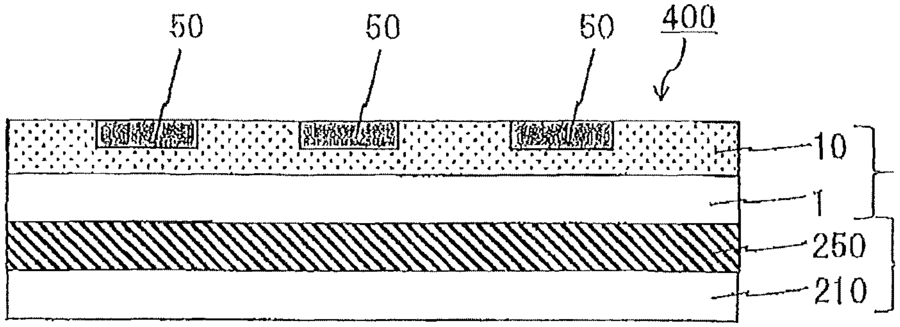
FIG. 8A to FIG. 8C are process views illustrating one example of the manufacturing process of the decorative product of the present disclosure.
Figure 8B:
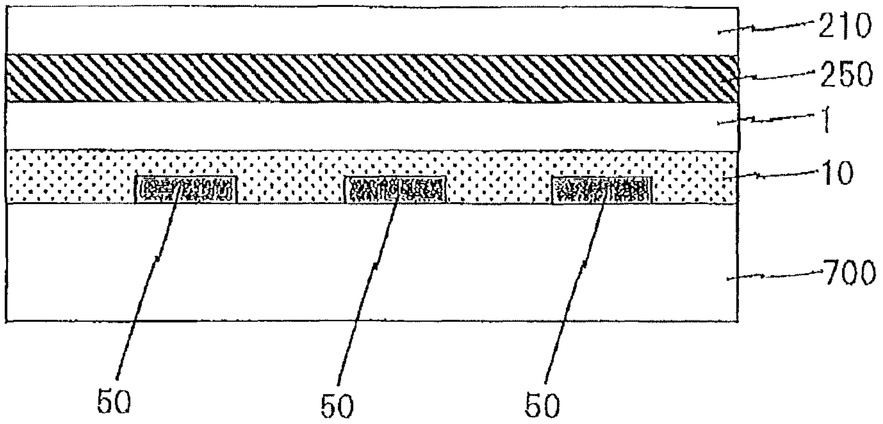
Figure 8C:
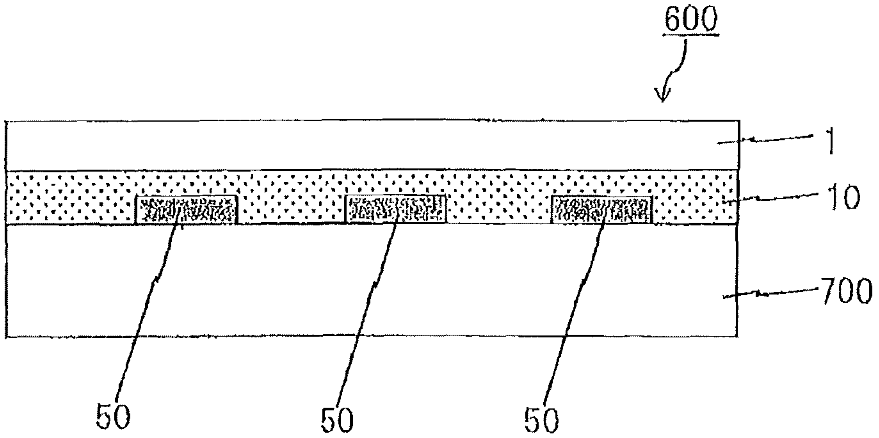

The method for manufacturing a decorative product of the present disclosure includes a step of obtaining a release member-integrated image sheet, an integrating step, and a step of separating the release member. FIG. 8A to FIG. 8C are process view illustrating one example of the method for manufacturing a decorative product of the present disclosure. In the illustrated example, the release member-integrated image sheet 400 is formed using the release member-integrated image forming sheet 300 illustrated in FIG. 2. The method for manufacturing a decorative product of the present disclosure is not limited to the illustrated form.

<Step of Obtaining Release Member-Integrated Image Sheet>

This step is a step of forming an image on the image layer 10 of the release member-integrated image forming sheet 300, thereby making the release member-integrated image forming sheet into the release member-integrated image sheet 400 (see FIG. 8A). The method for manufacturing an image sheet of the present disclosure uses the release member-integrated image forming sheet 300 of the present disclosure. This step is common with the step of obtaining a release member-integrated image sheet of the method for manufacturing an image sheet of the present disclosure.

<Integrating Step>

This step is a step of integrating the release member-integrated image sheet 400 with the decorative object 700 on the image layer 10 side (see FIG. 8B).

The method for manufacturing a decorative product as one example of the present disclosure includes a step of forming the durable layer 830 on the image layer 10 of the release member-integrated image sheet 400 before the integrating step. When the adhesion layer 850 is formed on the image layer 10 of the release member-integrated image sheet 400, the durable layer 830 is formed on the image layer 10 before the adhesion layer 850 is formed.

The method for manufacturing a decorative product as one example of the present disclosure includes a step of forming the adhesion layer 850 on the decorative object 700 and the image layer 10 of the release member-integrated image sheet 400 before the integrating step.

The methods for forming the durable layer 830 and the adhesion layer 850 are not limited, and it is only required to appropriately select the method for forming the adhesion layer or the durable layer described in the release member-integrated image sheet 400 of the present disclosure.

The shape, size, material, and the like of the decorative object 700 used in the method for manufacturing a decorative product of the present disclosure are not limited, and any shape, size, material, and the like may be used. Examples thereof include plain paper, wood free paper, tracing paper, wood, resin plates (or may be films) such as polycarbonate, acrylic resins, acrylonitrile-butadiene-styrene (ABS) resins, and polyvinyl chloride, metal plates such as aluminum, glass plates, and ceramic plates such as pottery. The decorative object 700 may be a laminate made of a plurality of members. The decorative object 700 may have a predetermined image, and the whole or a part thereof may have a curvature, a concave-convex structure, or the like. The decorative object 700 may have transparency such that the image 50 of the image layer 10 is visible when a decorative product 600 manufactured by the method for manufacturing a decorative product of the present disclosure is viewed from the decorative object 700 side.

<Step of Separating Release Member>

This step is the step of separating the release member 200 from the release member-integrated image sheet 400 integrated with the decorative object 700 (see FIG. 8C). Through this step, the decorative product 600 including the image sheet 500 integrated with the decorative object 700 is obtained.

The method for separating the separated release member 200 is not limited, and it is only required to appropriately select the separation method described in the method for manufacturing an image sheet of the present disclosure.

<Winding Step>

The method for manufacturing a decorative product as one example of the present disclosure includes a winding step of winding up the separated release member 200. The method for manufacturing the decorative product in this form provides good winding properties when the separated release member is wound up into a roll form.

In the method for manufacturing a decorative product of the present disclosure, although the step of separating the release member is carried out after the integrating step, the order of the integrating step and the step of separating the release member may be changed. This method is common with the method for manufacturing a decorative product of the present disclosure in other points.

When the release member-integrated image forming sheet 300 including the base material 1, the image layer 10, and the image forming sheet 100 having transparency as a whole is used in the method for manufacturing a decorative product of the present disclosure, the image of the image layer 10 is visible from the base material 1 side. In addition, the image 50 formed on the image layer 10 can be protected by the base material 1.

The method for manufacturing a decorative product of another embodiment of the present disclosure includes a step of obtaining a release member-integrated image sheet, a step of separating the release member, and a step of transferring a transfer layer.

Figure 9A:
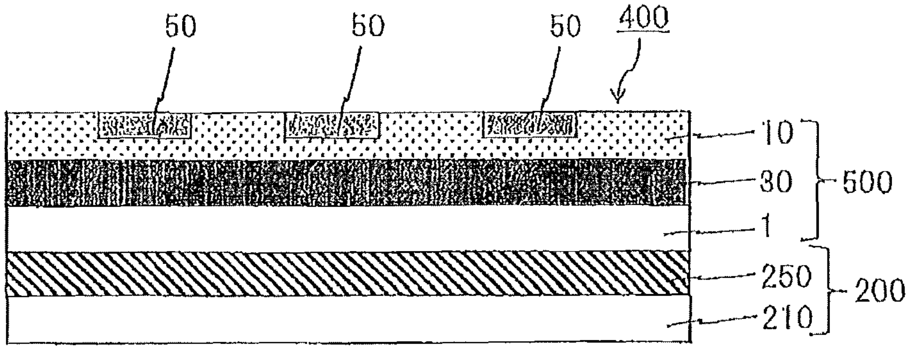
FIG. 9A to FIG. 9C are process views illustrating one example of the manufacturing process of the decorative product of the present disclosure.
Figure 9B:
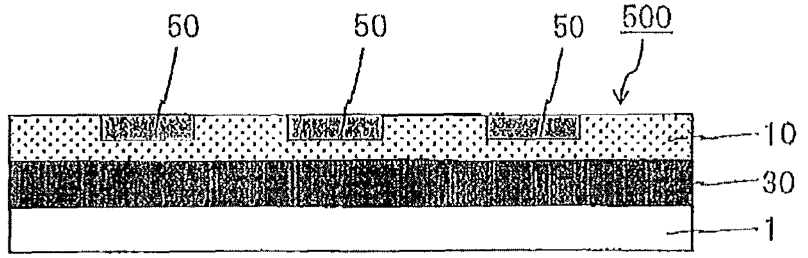
Figure 9C:
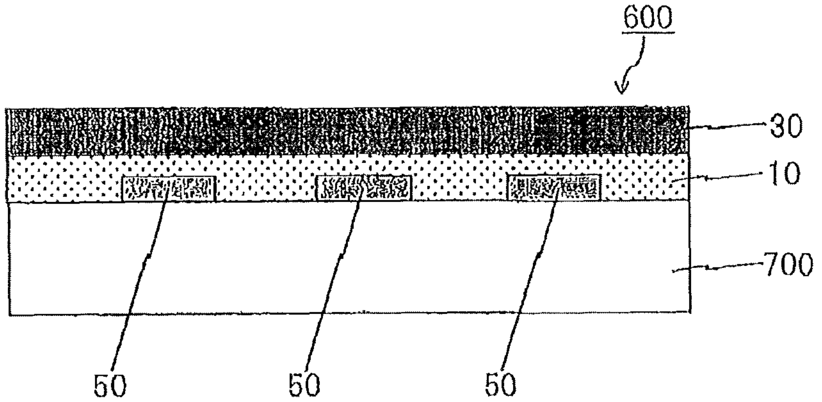

In the method for manufacturing a decorative product of another embodiment of the present disclosure, a release member-integrated image forming sheet provided with a transfer layer including an image layer before an image is formed is used as the release member-integrated image forming sheet. This method is common with the method for manufacturing a decorative product of the present disclosure except for the step of transferring a transfer layer. FIG. 9A to 9C are process views illustrating one example of another method for manufacturing a decorative product of the present disclosure. In the illustrated example, the release member-integrated image sheet 400 is formed using the release member-integrated image forming sheet 300 illustrated in FIG. 4. The method for manufacturing another decorative product of the present disclosure is not limited to the illustrated embodiment.

<Step of Transferring Transfer Layer>

This step is a step of transferring the transfer layer 40 of the image sheet 500 to a decorative object after the release member 200 is separated from the release member-integrated image sheet 400 (see FIG. 9C). Through this step, the decorative product 600 in which the transfer layer 40 of the image sheet 500 and the decorative object 700 are integrated is obtained.

The transfer of the transfer layer may be carried out by using a heat transfer manner of applying energy on the image sheet 500 or any of various conventionally known transfer manners other than the above manner. Examples of the heat transfer manner include a manner using a heating device such as a thermal head, a hot stamp manner, and a heat roll manner. Examples of the transfer manner other than those described above include various transfer manners such as a pad transfer manner, a press transfer manner, an in-mold transfer manner, a TOM (three dimension overlay method) molding transfer manner, a hydraulic transfer manner, and a pressure sensitive manner.

(Print System)

One example of the print system used in the method for manufacturing an image sheet of the present disclosure and the method for manufacturing a decorative product of the present disclosure will be described. The print system as one example includes an image formation device and a separation device.

The print system as one example includes a winding roller that winds up the separated release member 200 in a roll form. The print system as one example includes the image sheet 500 from which the release member 200 is separated and a winding roller that winds up the release member-integrated image sheet. These winding rollers may be independent of the printer, or may be provided in the printer.

Examples of the image formation device include a heating device such as a thermal head. Examples of the separation device include a peeling roller and a peeling plate.

The print system as one example includes one or more transfer devices. The print system as one example includes a transfer device that can transfer the adhesion layer 850 on the image layer 10 of the release member-integrated image sheet 400, the image sheet 500, and the decorative object 700. The print system as one example includes a transfer device that can transfer the durable layer 830 on the image layer 10 of the release member-integrated image sheet 400 and the image sheet 500. The print system as one example includes a transfer device that can transfer the transfer layer 40 of the image sheet 500 on the decorative object 700. These various transfer devices may be independent of or common with each other. These transfer devices may be independent of the printer, or may be provided in the printer.

The print system as one example includes an integration device that can integrate the release member-integrated image sheet 400 and the decorative object 700. The integration device may be independent of the printer, or may be provided in the printer.

The release member-integrated image forming sheet 300 of the present disclosure includes the image forming sheet 100 integrated with the release member 200, the image forming sheet 100 is separable from the release member 200, the image forming sheet 100 includes the image layer 10 before image formation, a stable peeling force when the image forming sheet 100 is separated from the release member 200 under conditions of a temperature of 25° C. and an angle of 30° is 1,000 mN/cm or less, and the release member 200 has a dynamic coefficient of friction between front and back surfaces of the release member 200 of 0.3 or more and 0.9 or less.

The release member-integrated image forming sheet 300 of the present disclosure may satisfy one or more of the following (1) to (9). When a plurality of them is satisfied, any of which may be combined.

(1) The initial peeling force when the image forming sheet 100 is separated from the release member 200 under conditions of a temperature of 25° C. and an angle of 30° is 2,500 mN/cm or less.

(2) The release member 200 includes a resin layer in contact with the image forming sheet 100.

(3) The resin layer contains any one of polyvinyl alcohol, polypropylene, polyethylene, an acrylic resin, polystyrene, and a cellulose resin.

(4) The resin layer contains a wax.

(5) The resin layer contains a resin having an elongation at break of 50% or more and 500% or less.

(6) The release member 200 includes a void layer not in contact with the image forming sheet 100.

(7) The image forming sheet 100 includes a release layer in contact with the release member 200.

(8) The image forming sheet 100 has a lamination structure in which the base material 1 and the image layer 10 before image formation are laminated from the release member 200 side in the order presented.

(9) The image forming sheet 100 has a lamination structure in which the base material 1 and the transfer layer 40 including the image layer 10 before image formation are laminated from the release member 200 side in the order presented, and the transfer layer 40 is provided so as to be transferable from base material 1.

The release member-integrated image sheet 400 of the present disclosure includes an image formed on the image layer 10 before image formation of the release member-integrated image forming sheet 300 of the present disclosure.

The release member-integrated image sheet 400 of the present disclosure includes an image formed on the image layer 10 before image formation of the release member-integrated image forming sheet 300 of the present disclosure, and an adhesion layer is provided on this image layer 10.

The image sheet 500 of the present disclosure is obtained by separating the release member 200 from the release member-integrated image sheet 400 of the present disclosure.

The method for manufacturing an image sheet of the present disclosure includes a step of obtaining the release member-integrated image sheet 400 by forming an image on the image layer 10 before image formation of the release member-integrated image forming sheet 300 of the present disclosure, and a step of separating the release member from the release member-integrated image sheet 400.

The method for manufacturing an image sheet of the present disclosure may satisfy either one of or both the following (10) and (11).

(10) A step of providing the adhesion layer 850 on the image layer 10 on which an image is formed is included.

(11) A step of winding up the separated release member 200 is included.

The decorative product 600 of the present disclosure is obtained by integrating the image sheet 500 manufactured by the method for manufacturing an image sheet of the present disclosure and the decorative object 700.

The method for manufacturing a decorative product of the present disclosure includes a step of obtaining the release member-integrated image sheet 400 by forming an image on the image layer 10 before image formation of the release member-integrated image forming sheet 300 of the present disclosure, a step of integrating the release member-integrated image sheet 400 with the decorative object 700 on the image layer 10 side, and a step of separating the release member 200 from the release member-integrated image sheet 400 integrated with the decorative object 700.

The method for manufacturing a decorative product of the present disclosure includes a step of obtaining the release member-integrated image sheet 400 by forming an image on the image layer 10 before image formation of the release member-integrated image forming sheet 300 of the present disclosure, a step of separating the release member 200 from the release member-integrated image sheet 400, and a step of integrating the image sheet 500 separated from the release member 200 with the decorative object 700 on the image layer 10 side.

The method for manufacturing a decorative product of the present disclosure may include a step of providing an adhesion layer on the decorative object 700 or the image layer 10 on which an image is formed before the integrating step.

The method for manufacturing a decorative product of the present disclosure includes a step of obtaining the release member-integrated image sheet 400 by forming an image on the image layer 10 before image formation of the release member-integrated image forming sheet 300 of the present disclosure, a step of separating the release member 200 from the release member-integrated image sheet 400, and a step of transferring the transfer layer 40 on the decorative object 700 after the separating step.

The method for manufacturing a decorative product of the present disclosure may satisfy either one of or both the following (12) and (13).

(12) A step of providing the adhesion layer 850 on the decorative object 700 or the transfer layer 40 is included before the step of transferring the transfer layer 40.

(13) A step of winding up the separated release member 200 is included after the separating step.

EXAMPLES

Next, the present invention will be described further in detail with reference to Examples and Comparative Examples. Hereinafter, unless otherwise specified, the part or % is based on the mass and is the value before conversion to solid content.

<Coating Liquid for Resin Layer 1>

| | |
|---|---|
| Polypropylene (solid content 30%) (ZAIKTHENE(R) A, SUMITOMO SEIKA CHEMICALS CO., LTD.) | 50 parts |
| Water | 25 parts |
| Isopropyl alcohol | 25 parts |

<Coating Liquid for Resin Layer 2>

| | |
|---|---|
| Polypropylene (solid content 30%) (ZAIKTHENE (R) A, SUMITOMO SEIKA CHEMICALS CO., LTD.) | 45 parts |
| Ethoxylated alcohol (UNITHOX(R) 750, Baker Hughes Company) | 1.5 parts |
| Water | 28.5 parts |
| Isopropyl alcohol | 25 parts |

<Coating Liquid for Resin Layer 3>

| | |
|---|---|
| Polyvinyl alcohol (GOHSENOL(R) GL-03, Mitsubishi Chemical Corporation) | 15 parts |
| Water | 65 parts |
| Isopropyl alcohol | 20 parts |

<Coating Liquid for Resin Layer 4>

| | |
|---|---|
| Polyvinyl alcohol (GOHSENOL(R) GL-03, Mitsubishi Chemical Corporation) | 13.5 parts |
| Ethoxylated alcohol (UNITHOX(R) 750, Baker Hughes Company) | 1.5 parts |
| Water | 65 parts |
| Isopropyl alcohol | 20 parts |

<Coating Liquid for Resin Layer 5>

| | |
|---|---|
| Acrylic resin (DIANAL(R) BR-80, Mitsubishi Chemical Corporation) | 15 parts |
| Methyl ethyl ketone | 42.5 parts |
| Toluene | 42.5 parts |

<Coating Liquid for Resin Layer 6>

| | |
|---|---|
| Acrylic resin (DIANAL(R) BR-80, Mitsubishi Chemical Corporation) | 13.5 parts |
| Polyethylene wax (POLYWAX 400, Baker Hughes Company) | 1.5 parts |
| Methyl ethyl ketone | 42.5 parts |
| Toluene | 42.5 parts |

<Coating Liquid for Resin Layer 7>

| | |
|---|---|
| Styrene-acrylic copolymer (DIANAL(R) BR-52, Mitsubishi Chemical Corporation) | 15 parts |
| Methyl ethyl ketone | 42.5 parts |
| Toluene | 42.5 parts |

<Coating Liquid for Resin Layer 8>

| | |
|---|---|
| Styrene-acrylic copolymer (DIANAL(R) BR-52, Mitsubishi Chemical Corporation) | 14.85 parts |
| Polyester (VYLON(R) 200, TOYOBO CO., LTD.) | 0.15 parts |
| Methyl ethyl ketone | 42.5 parts |
| Toluene | 42.5 parts |

<Coating Liquid for Resin Layer 9>

| | |
|---|---|
| Cellulose acetate butyrate (CAB-381-2, Eastman Chemical Company) | 13.5 parts |
| Polyethylene wax (POLYWAX 400, Baker Hughes Company) | 1.5 parts |
| Methyl ethyl ketone | 42.5 parts |
| Toluene | 42.5 parts |

<Coating Liquid for Resin Layer 10>

| | |
|---|---|
| Polystyrene (G100C, TOYO STYRENE Co., Ltd) | 15 parts |
| Methyl ethyl ketone | 42.5 parts |
| Toluene | 42.5 parts |

<Coating Liquid for Resin Layer 11>

| | |
|---|---|
| Polyester (VYLON(R) 200, TOYOBO CO., LTD.) | 15 parts |
| Methyl ethyl ketone | 42.5 parts |
| Toluene | 42.5 parts |

<Coating Liquid for Resin Layer 12>

| | |
|---|---|
| Acrylic adhesive (solid content 38%) (SK-Dyne 1251, Soken Chemical & Engineering Co., Ltd.) | 80 parts |
| Curing agent (solid content 45%) (L-45, Soken Chemical & Engineering Co., Ltd.) | 4 parts |
| Ethyl acetate | 16 parts |

(Base Material of Image Forming Sheet)

Sheet 1 . . . A polyethylene terephthalate film having a thickness of 25 μm (E5100, TOYOBO CO., LTD.)

Sheet 2 . . . A coating mat film having a thickness of 38 μm (CM-38, UNITIKA LTD.)

Sheet 3 . . . A non-Si release treated polyethylene terephthalate film having a thickness of 38 μm (unipeel, UNITIKA LTD.)

Sheet 4 . . . A polypropylene film having a thickness of 25 μm (TORAYFAN® #25-2548, TORAY INDUSTRIES, INC.)

Sheet 5 . . . A film in which a release layer having a thickness of 0.5 μm is formed on the sheet 1 using a coating liquid for a release layer having the following composition <Coating Liquid for Release Layer>

| | |
|---|---|
| Addition polymerization agent silicone (solid content 31%) (KS-847, Shin-Etsu Chemical Co., Ltd.) | 30 parts |
| Catalyst (solid content 10%) (CAT-PL-50T, Shin-Etsu Chemical Co., Ltd.) | 3 parts |
| Methyl ethyl ketone | 33.5 parts |
| Toluene | 33.5 parts |

Example 1

The coating liquid for resin layer 1 having the above composition was coated on one surface of the sheet 1 prepared above and dried to form a resin layer. A coating liquid for adhesion layer having the following composition was coated on the resin layer and dried to form an adhesion layer. The adhesion layer formed on the resin layer and a void polypropylene film having a thickness of 35 μm (Mitsui Chemicals Tohcello, Inc.) were pasted together. A coating liquid for adhesion layer having the following composition was coated on the other surface of the sheet 1 and dried to form an adhesion layer. A coating liquid for receiving layer having the following composition was coated on the adhesion layer and dried to form a receiving layer. An adhesive was coated on the void propylene film (Mitsui Chemicals Tohcello, Inc.) having a thickness of 35 μm, which was pasted on a paper base material having a thickness of 130 μm, whereby the release member-integrated image forming sheet of Example 1 was obtained. The thickness of the resin layer was 1 μm. The thickness of the adhesion layer formed on the resin layer and the thickness of the adhesion layer formed on the other surface of the sheet 1 were 3 μm. The thickness of the receiving layer was 3 μm.

The release member in Example 1 had a lamination structure in which the paper base material, the adhesive, the void propylene film, the adhesion layer, and the resin layer were laminated in the order presented.

The image forming sheet in Example 1 had a lamination structure in which the sheet 1, the adhesion layer, and the receiving layer were laminated from the resin layer side of the release member in the order presented.

The interface between the sheet 1 and the resin layer in Example 1 was the separation interface. Also in each release member-integrated image forming sheet of Examples and Comparative Examples, the interface between each sheet (the sheets 1 to 5) and the resin layer was the separation interface.

<Coating Liquid for Adhesion Layer>

| | |
|---|---|
| Polyfunctional polyol (TAKELAC(R) A-969-V, Mitsui Chemicals, Inc.) | 30 parts |
| Curing agent (TAKENATE(R) A-5, Mitsui Chemicals, Inc.) | 10 parts |
| Ethyl acetate | 60 parts |

<Coating Liquid for Receiving Layer>

| | |
|---|---|
| Vinyl chloride-vinyl acetate copolymer (SOLBIN(R) CNL, Nissin Chemical Industry Co., Ltd.) | 19 parts |
| Organic-modified silicone (X-22-3000T, Shin-Etsu Chemical Co., Ltd.) | 1 part |
| Methyl ethyl ketone | 40 parts |
| Toluene | 40 parts |

Examples 2 to 14 and Comparative Examples 1, 2, and 4

Each release member-integrated image forming sheet of Examples 2 to 14 and Comparative Examples 1, 2, and 4 was obtained in the same manner as Example 1, except for changing the sheet 1 in Example 1 to the sheet shown in the following Table 1 and changing the coating liquid for resin layer 1 and the thickness thereof to the coating liquid for resin layer and the thickness shown in the following Table 1. In the formation of the release member-integrated image forming sheet of Comparative Example 4 using the sheet 5, the resin layer was formed on the release layer side of the sheet 5.

TABLE 1

| | Base material of image forming sheet | Coating liquid for resin layer | Resin layer thickness (μm) |
|---|---|---|---|
| Example 1 | Sheet 1 | Coating liquid 1 | 0.8 |
| Example 2 | Sheet 2 | Coating liquid 1 | 0.8 |
| Example 3 | Sheet 1 | Coating liquid 2 | 0.8 |
| Example 4 | Sheet 2 | Coating liquid 2 | 0.8 |
| Example 5 | Sheet 1 | Coating liquid 3 | 0.8 |
| Example 6 | Sheet 1 | Coating liquid 4 | 0.8 |
| Example 7 | Sheet 1 | Coating liquid 5 | 0.8 |
| Example 8 | Sheet 1 | Coating liquid 6 | 0.8 |
| Example 9 | Sheet 3 | Coating liquid 6 | 0.8 |
| Example 10 | Sheet 4 | Coating liquid 6 | 0.8 |
| Example 11 | Sheet 1 | Coating liquid 7 | 0.8 |
| Example 12 | Sheet 1 | Coating liquid 8 | 0.8 |
| Example 13 | Sheet 1 | Coating liquid 9 | 0.8 |
| Example 14 | Sheet 1 | Coating liquid 10 | 0.8 |
| Comparative Example 1 | Sheet 2 | Coating liquid 1 | 0.15 |
| Comparative Example 2 | Sheet 1 | Coating liquid 11 | 0.8 |
| Comparative Example 4 | Sheet 5 | Coating liquid 12 | 10 |

Example 15

Figure 11:
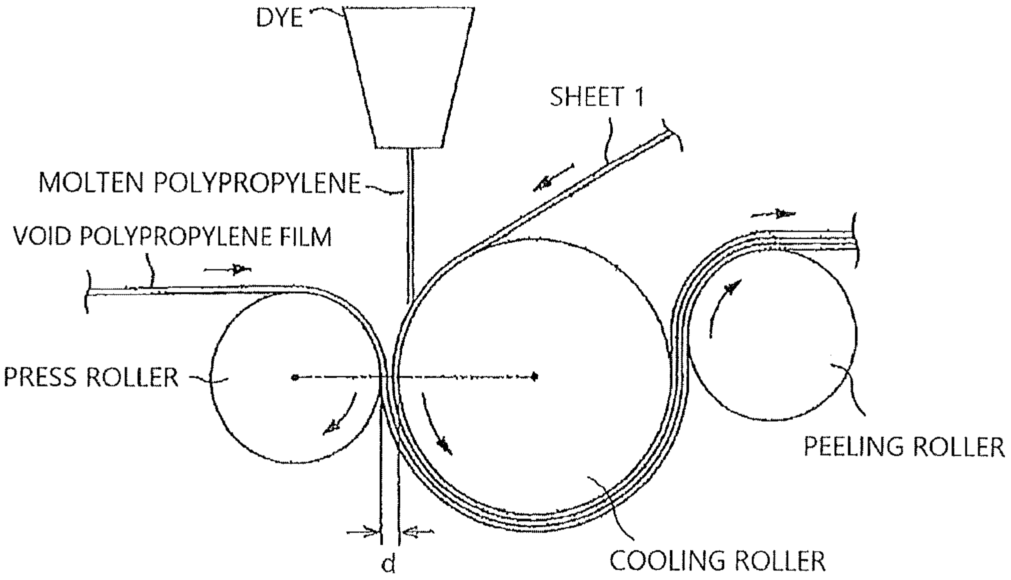
FIG. 11 is a schematic configuration diagram of a melt extrusion apparatus used in the manufacture of Examples and Comparative Examples.

A void polypropylene film having a thickness of 35 μm (Mitsui Chemicals Tohcello, Inc.) and the above sheet 1 were prepared. Using a melt extrusion apparatus (see FIG. 11) in which a pair of press roller and a cooling roller were provided and a die was arranged at a position 5 mm moved from the position corresponding to the middle point of the distance d to the cooling roller side, a void polypropylene film (Mitsui Chemicals Tohcello, Inc.) having a thickness of 35 μm was arranged on the press roller side and the sheet 1 was arranged on the cooling roller side. Then, while passing the void polypropylene film (Mitsui Chemicals Tohcello, Inc.) having a thickness of 35 μm and the sheet 1 between a pair of rollers, molten polypropylene (melting point: 111° C., density: 0.900 g/cm$^3$) was extruded between the void polypropylene film and the sheet 1 to form a resin layer. Thereafter, the sheet 1 was peeled from the cooling roller to obtain a laminate in which the void polypropylene film (Mitsui Chemicals Tohcello, Inc.) having a thickness of 35 μm and the sheet 1 were pasted by the resin layer. The thickness of the resin layer was 15 μm. The coating liquid for adhesion layer having the above composition was coated on the sheet 1 of the laminate obtained above and dried to form an adhesion layer. The coating liquid for receiving layer having the above composition was coated on the adhesion layer and dried to form a receiving layer. The coating liquid for adhesion layer having the above composition was coated on the void polypropylene film (Mitsui Chemicals Tohcello, Inc.) of the laminate obtained above and dried to form an adhesion layer, which was pasted on a paper base material having a thickness of 130 μm, whereby the release member-integrated image forming sheet of Example 15 was obtained. The thickness of the adhesion layer formed on the sheet 1 and the thickness of the adhesion layer formed on the void polypropylene film (Mitsui Chemicals Tohcello, Inc.) were 3 μm. The thickness of the receiving layer was 3 μm. The distance d was appropriately adjusted considering the void polypropylene film (Mitsui Chemicals Tohcello, Inc.) having a thickness of 35 μm and the thickness of the sheet 1.

The release member in Example 15 had a lamination structure in which the paper base material, the adhesion layer, the void polypropylene film, and the resin layer (melt extruded resin layer) were laminated.

The image forming sheet in Example 15 had a lamination structure in which the sheet 1, the adhesion layer, and the receiving layer were laminated from the resin layer side of the release member in the order presented.

Example 16

The release member-integrated image forming sheet of Example 16 was obtained in the same manner as Example 15, except for forming a resin layer with molten polyethylene (melting point: 120° C., density: 0.95 g/cm$^3$) instead of molten polypropylene (melting point: 111° C., density: 0.900 g/cm$^3$).

Comparative Example 3

The release member-integrated image forming sheet of Comparative Example 3 was obtained in the same manner as Example 15, except for forming a resin layer with molten polyethylene (melting point: 107° C., density: 0.919 g/cm$^3$) instead of molten polypropylene (melting point: 111° C., density: 0.900 g/cm$^3$).

(Measurement of Stable Peeling Force and Initial Peeling Force)

The stable peeling force and the initial peeling force of each release member-integrated image forming sheet of Examples and Comparative Examples were calculated. The calculation results are shown in Table 2. Calculation of the stable peeling force and the initial peeling force was carried out based on the method for calculating the stable peeling force and the method for calculating the initial peeling force described above.

(Fabrication of Image Forming Heat Transfer Sheet)

Using a polyethylene terephthalate film having a thickness of 5 μm as the base material, a coating liquid for dye primer layer having the following composition was coated on one surface of the base material so that the thickness after drying was 0.15 μm, and dried to form a dye primer layer. Coating liquids for yellow, magenta, and cyan color material layers having the following compositions were coated on the dye primer layer in a frame sequential manner so that the thickness after drying was 0.7 μm, and dried to form a yellow color material layer, a magenta color material layer, and a cyan color material layer. Further, a coating liquid for back surface layer having the following composition was coated on the other surface of the base material so that the thickness after drying was 1 μm, and dried to form a back surface layer, whereby an image forming heat transfer sheet was obtained.

<Coating Liquid for Back Surface Layer>

| | |
|---|---|
| Polyvinyl butyral (S-LEC(R) BX-1, SEKISUI CHEMICAL CO., LTD.) | 1.8 parts |
| Polyisocyanate (BURNOCK(R) D750, DIC CORPORATION) | 5.5 parts |
| Phosphoric acid ester-based surfactant (PLYSURF(R) A208N, DKS Co. Ltd.) | 1.6 parts |
| Talc (MICRO ACE(R) P-3, Nippon Talc Co., Ltd.) | 0.35 parts |
| Toluene | 18.5 parts |
| Methyl ethyl ketone | 18.5 parts |

<Coating Liquid for Dye Primer Layer>

| | |
|---|---|
| Colloidal alumina (solid content 10.5%) (ALUMINASOL 200, Nissan Chemical Corporation) | 3.5 parts |
| Vinyl acetate-vinyl pyrrolidone copolymer (PVP/VA E-335, ISP Japan Ltd.) | 1.5 parts |
| Water | 47.5 parts |
| Isopropyl alcohol | 47.5 parts |

<Coating Liquid for Yellow Color Material Layer>

| | |
|---|---|
| Solvent Yellow 93 | 2.5 parts |
| Disperse yellow 201 | 2.5 parts |
| Polyvinyl acetal (S-LEC(R) KS-5, SEKISUI CHEMICAL CO., LTD.) | 4 parts |
| Organic-modified silicone oil | 0.04 parts |
| Toluene | 50 parts |
| Methyl ethyl ketone | 50 parts |

<Coating Liquid for Magenta Color Material Layer>

| | |
|---|---|
| Disperse Red 60 | 3 parts |
| Disperse Violet 26 | 3 parts |
| Polyvinyl acetal (S-LEC(R) KS-5, SEKISUI CHEMICAL CO., LTD.) | 5 parts |
| Organic-modified silicone oil | 0.05 parts |
| Toluene | 50 parts |
| Methyl ethyl ketone | 50 parts |

<Coating Liquid for Cyan Color Material Layer>

| | |
|---|---|
| Solvent Blue 63 | 3 parts |
| Disperse Blue 354 | 4 parts |
| polyvinyl acetal (S-LEC(R) KS-5, SEKISUI CHEMICAL CO., LTD.) | 5 parts |
| Organic-modified silicone oil | 0.05 parts |
| Toluene | 50 parts |
| Methyl ethyl ketone | 50 parts |

(Formation of Image)

Each release member-integrated image forming sheet of Examples and Comparative Examples obtained above and the image forming heat transfer sheet obtained above were set in the following test printer, and a black image (image gradation: 0/255) was formed on the receiving layer of each release member-integrated image forming sheet, whereby each release member-integrated image forming sheet of Examples and Comparative Examples was obtained.

(Test Printer)

Thermal head: KEE-57-12GAN2-STA (KYOCERA Corporation)

Heating element average resistance value: 3303 (Ω)

Printing density in main scanning direction: 300 (dpi)

Printing density in sub scanning direction: 300 (dpi)

Printing voltage: 18 (V)

Line period: 1.5 (msec./line)

Printing initiation temperature: 35(° C.)

Pulse duty ratio: 85(%)

(Formation of Image Sheet)

The release member was separated by hand from the image sheet of each release member-integrated image sheet of Examples and Comparative Examples obtained above, whereby each image sheet of Examples and Comparative Examples was obtained.

(Calculation of Dynamic Coefficient of Friction)

Two release members that are separated from the image sheet of each release member-integrated image sheet of Examples and Comparative Examples were prepared. The front surface of one release member and the back surface of the other release member were superposed, and the dynamic coefficient of friction between the front and back surfaces of the superposed release members was calculated. Calculation of the dynamic coefficient of friction was carried out based on the method for calculating the dynamic coefficient of friction described above. The calculation results of the dynamic coefficient of friction are shown in Table 2.

(Elongation at Break)

The elongation at break of the resin constituting the resin layer of each release member-integrated image forming sheet of Examples and Comparative Examples is shown in Table 2. The elongation at break of the resin was calculated based on the method for calculating the elongation at break described above.

(Evaluation 1 of Separation Properties)

The release properties when the image sheet was separated from the release member of each release member-integrated image sheet of Examples and Comparative Examples and the quality of the image of the image sheet separated from the release member were verified, and the separation properties were evaluated based on the following evaluation criteria. The evaluation results are shown in Table 2.

<Evaluation Criteria>

A . . . The image sheet can be very easily peeled from the release member, and no problem is caused on the image of the image sheet separated from the release member.

B . . . The image sheet can be peeled from the release member without any problem, and no problem is caused on the image of the image sheet separated from the release member.

C . . . It is slightly difficult to peel the image sheet from the release member, but no problem is caused on the image of the image sheet separated from the release member.

NG1 . . . It is difficult to peel the image sheet from the release member, and the peel trace is found on the image of the image sheet separated from the release member.

NG2 . . . It is difficult to peel the image sheet from the release member, and the peel trace which causes problems in use is found on the image of the image sheet separated from the release member.

(Evaluation 2 of Separation Properties)

The workability when the image sheet was separated from the release member of each release member-integrated image sheet of Examples and Comparative Examples was verified, and the separation properties were evaluated based on the following evaluation criteria. The evaluation results are shown in Table 2. When the separating work at the initial peeling portion is good, the time from the initiation of the separation until the completion of the separation can be shortened, resulting in good manufacturing suitability.

<Evaluation Criteria>

A . . . The image sheet can be easily separated from the initial portion of peeling, and the separating work is very easy.

B . . . The image sheet can be easily separated from the initial portion of peeling, and the separating work is easy.

C . . . It is difficult to peel the image sheet from the initial portion of peeling, but the separating work itself is capable.

NG1 . . . It is difficult to peel the image sheet from the initial portion of peeling, and the separating work is difficult.

NG2 . . . It is very difficult to peel the image sheet from the initial portion of peeling, and the separating work is impossible.

(Suitability for Cutting)

The suitability for cutting when each release member-integrated image sheet of Examples and Comparative Examples was cut by a cutter mechanism in the printer (DS620, Dai Nippon Printing Co., Ltd.) was evaluated based on the following evaluation criteria. The evaluation results are shown in Table 2.

<Evaluation Criteria>

A . . . No lifting of the release member is found at the cut portion.

B . . . The lifting of the release member is found at a part of the cut portion.

C . . . The lifting of the release member is found in a large part of the cut portion.

(Suitability for Winding Up)

The release member of each release member-integrated image sheet of Examples and Comparative Examples which was separated from the image sheet in the above evaluation 1 was set in a winding test machine, and the suitability for winding up when the release member was wound up under the following conditions was evaluated based on the following evaluation criteria. The evaluation results are shown in Table 2.

Winding diameter: a core (paper pipe) having an outer diameter of 8 cm

Winding rate: 15 m/min.

Winding length: 50 m

<Evaluation Criteria>

A . . . The release member can be wound up without any problem.

NG1 . . . The front and back surfaces of the release member are caught during winding up.

NG2 . . . The release member meanders during winding up.

TABLE 2

| | Stable peeling force (mN/cm) | Initial peeling force (mN/cm) | Dynamic coefficient of friction | Elongation at break (%) | Evaluation of separation properties 1 | Evaluation of separation properties 2 | Suitability for winding up | Suitability for cutting |
|---|---|---|---|---|---|---|---|---|
| Example 1 | 240 | 750 | 0.8 | 250 | A | B | A | A |
| Example 2 | 490 | 850 | 0.8 | 250 | B | B | A | A |
| Example 3 | 170 | 200 | 0.75 | 250 | A | A | A | A |
| Example 4 | 180 | 260 | 0.75 | 250 | A | A | A | A |
| Example 5 | 280 | 800 | 0.65 | 150 | A | B | A | A |
| Example 6 | 200 | 320 | 0.65 | 150 | A | A | A | A |
| Example 7 | 800 | 3000 | 0.6 | 5 | C | NG1 | A | A |
| Example 8 | 250 | 1500 | 0.5 | 5 | A | C | A | A |
| Example 9 | 150 | 400 | 0.5 | 5 | A | B | A | A |
| Example 10 | 140 | 350 | 0.5 | 5 | A | A | A | A |
| Example 11 | 70 | 800 | 0.6 | 3 | A | A | A | C |
| Example 12 | 150 | 1700 | 0.6 | 3 | A | C | A | A |
| Example 13 | 750 | 1800 | 0.65 | 5 | C | C | A | A |
| Example 14 | 50 | 70 | 0.6 | 3 | A | A | A | C |
| Example 15 | 320 | 800 | 0.4 | 400 | B | B | A | A |
| Example 16 | 600 | 1250 | 0.4 | 700 | C | C | A | A |
| Comparative Example 1 | 1500 | 3000 | 0.4 | 250 | NG1 | NG1 | NG1 | A |
| Comparative Example 2 | >5000 | >5000 | 0.4 | 3 | NG2 | NG2 | NG1 | A |
| Comparative Example 3 | 3000 | >5000 | 0.4 | 900 | NG2 | NG2 | NG1 | A |
| Comparative Example 4 | 120 | 140 | ND | ND | A | A | NG2 | B |

REFERENCE SIGNS LIST

100 . . . Image forming sheet
200 . . . Release member
300 . . . Release member-integrated image forming sheet
400 . . . Release member-integrated image sheet
500 . . . Image sheet
600 . . . Decorative product
700 . . . Decorative object
800 . . . Transfer sheet
1 . . . Base material
10 . . . Image layer
20 . . . Primer layer
30 . . . Release layer
40 . . . Transfer layer
50 . . . Image
210 . . . Support for release member
250 . . . Resin layer
810 . . . Base material of transfer sheet
830 . . . Durable layer
835 . . . Adhesion layer with durable layer
840 . . . Masking member
845 . . . Adhesion layer with masking member
850 . . . Adhesion layer

The invention claimed is:

1. A release member-integrated image forming sheet, comprising:

an image forming sheet integrated with a release member, wherein the image forming sheet is separable from the release member, wherein the image forming sheet comprises an image layer before image formation, wherein the image forming sheet has a laminated structure in which a base material and the image layer, before image formation, are laminated from the release member side in this order, wherein the release member has a laminated structure in which a support for the release member, a void layer, a resin layer are laminated in this order, wherein the support for the release member is a paper base material, wherein a stable peeling force when the image forming sheet is separated from the release member under conditions of a temperature of 25° C. and an angle of 30° is 1,000 mN/cm or less, and wherein the release member has a dynamic coefficient of friction between front and back surfaces of the release member of 0.3 or more and 0.9 or less.

2. The release member-integrated image forming sheet according to claim 1, wherein an initial peeling force when the image forming sheet is separated from the release member under conditions of a temperature of 25° C. and an angle of 30° is 2,500 mN/cm or less.

3. The release member-integrated image forming sheet according to claim 1, wherein the resin layer is in contact with the image forming sheet.

4. The release member-integrated image forming sheet according to claim 1, wherein the resin layer contains any one of polyvinyl alcohol, polypropylene, polyethylene, an acrylic resin, polystyrene, and a cellulose resin.

5. The release member-integrated image forming sheet according to claim 1, wherein the resin layer contains a wax.

6. The release member-integrated image forming sheet according to claim 1, wherein the resin layer contains a resin having an elongation at break of 50% or more and 500% or less.

7. A release member-integrated image sheet, comprising an image formed on the image layer before image formation of the release member-integrated image forming sheet according to claim 1.

8. The release member-integrated image sheet according to claim 7, wherein an adhesion layer is provided on the image layer on which the image is formed.

9. A method for manufacturing an image sheet, comprising:

obtaining a release member-integrated image sheet by forming an image on the image layer before image formation of the release member-integrated image forming sheet according to claim 1; and separating the release member from the release member-integrated image sheet.

10. The method for manufacturing an image sheet according to claim 9, further comprising providing an adhesion layer on the image layer on which the image is formed.

11. The method for manufacturing an image sheet according to claim 9, comprising winding up the separated release member.

12. A method for manufacturing a decorative product, comprising:

obtaining a release member-integrated image sheet by forming an image on the image layer before image formation of the release member-integrated image forming sheet according to claim 1;

integrating the release member-integrated image sheet with a decorative object on the image layer; and separating the release member from the release member-integrated image sheet integrated with the decorative object.

13. The method for manufacturing a decorative product according to claim 12, further comprising providing an adhesion layer on the decorative object or the image layer on which the image is formed, before integrating.

14. The method for manufacturing a decorative product according to claim 12, comprising a winding up the separated release member after separating.

15. A method for manufacturing a decorative product, comprising:

obtaining a release member-integrated image sheet by forming an image on the image layer before image formation of the release member-integrated image forming sheet according to claim 1;

separating the release member from the release member-integrated image sheet; and integrating the image sheet separated from the release member with a decorative object on the image layer.

* * * * *